(12) United States Patent
Matsuura et al.

(10) Patent No.: US 10,641,389 B2
(45) Date of Patent: May 5, 2020

(54) ACTUATOR UNIT FOR CONTROLLING HYDRAULIC PUMP

(71) Applicant: Kanzaki Kokyukoki Mfg. Co., Ltd., Amagasaki-shi (JP)

(72) Inventors: Jun Matsuura, Amagasaki (JP); Koji Iwaki, Amagasaki (JP); Tomoyuki Tsuji, Amagasaki (JP); Minoru Kamada, Amagasaki (JP); Hideki Kanenobu, Amagasaki (JP); Kengo Sasahara, Amagasaki (JP)

(73) Assignee: Kanzaki Kokyukoki Mfg. Co., Ltd., Amagasaki-shi (JP)

( * ) Notice: Subject to any disclaimer, the term of this patent is extended or adjusted under 35 U.S.C. 154(b) by 124 days.

(21) Appl. No.: 15/650,358

(22) Filed: Jul. 14, 2017

(65) Prior Publication Data

US 2017/0307075 A1 Oct. 26, 2017

Related U.S. Application Data

(63) Continuation of application No. 14/817,922, filed on Aug. 4, 2015, now abandoned.

(30) Foreign Application Priority Data

Aug. 7, 2014 (JP) .................................. 2014-161495
Aug. 8, 2014 (JP) .................................. 2014-162729

(51) Int. Cl.
*F16H 61/4069* (2010.01)
*F04B 1/00* (2020.01)
(Continued)

(52) U.S. Cl.
CPC ........... *F16H 61/4069* (2013.01); *F04B 1/00* (2013.01); *F04B 23/04* (2013.01); *F16H 39/04* (2013.01); *F16H 61/431* (2013.01); *F16H 47/02* (2013.01)

(58) Field of Classification Search
CPC .. F04B 1/00; F04B 23/04; F16H 39/04; F16H 61/431
(Continued)

(56) References Cited

U.S. PATENT DOCUMENTS 3,054,263 A * 9/1962 Budzich .................. F16H 61/46
417/285
3,157,998 A 11/1964 Harris
(Continued)

FOREIGN PATENT DOCUMENTS

GB 688114 A 2/1953
JP S56-151509 U 11/1981
(Continued)

OTHER PUBLICATIONS

Notification of Reason for Refusal issued in Japanese Patent Application No. 2014-161495 dated Jan. 30, 2018.
(Continued)

*Primary Examiner* — Nathaniel E Wiehe
*Assistant Examiner* — Richard C Drake
(74) *Attorney, Agent, or Firm* — Sterne, Kessler, Goldstein & Fox P.L.L.C.

(57) ABSTRACT

An HST control mechanism includes a rotary member, a servo unit, a telescopic member, and a biasing device. The rotary member for controlling a displacement of a hydrostatic transmission (HST) is pivoted outside of a casing incorporating the HST. The servo unit includes a telescopically movable actuator and a valve controlling the telescopic movement of the actuator. The actuator is interlockingly connected to the rotary member. The servo unit is pivotally supported on the casing via a first pivot. The servo unit rotates centered on the first pivot as the rotary member rotates according to the telescopic movement of the actuator hydraulically controlled by the valve. The telescopic mem- (Continued)

ber is pivotally supported on the casing via a second pivot. The telescopic member is provided with the biasing device that biases the telescopic member and the rotary member toward a position corresponding to a neutral state of the HST.

5 Claims, 19 Drawing Sheets

(51) Int. Cl.
*F04B 23/04* (2006.01)
*F04B 39/04* (2006.01)
*F16H 61/431* (2010.01)
*F16H 39/04* (2006.01)
*F16H 47/02* (2006.01)

(58) Field of Classification Search
USPC .................................................. 60/443, 444
See application file for complete search history.

(56) References Cited

U.S. PATENT DOCUMENTS

| | | | |
|---|---|---|---|
| 3,340,450 A | 9/1967 | Stilley et al. | |
| 3,508,401 A | 4/1970 | Aplin | |
| 4,735,050 A * | 4/1988 | Hayashi | F04B 1/124 60/489 |
| 4,781,022 A * | 11/1988 | Hayashi | F16H 39/14 60/489 |
| 4,845,951 A * | 7/1989 | Hayashi | F16H 39/14 60/488 |
| 4,977,760 A * | 12/1990 | Ishimori | F16H 61/42 60/444 |
| 5,233,880 A * | 8/1993 | Sato | F16H 59/06 74/473.16 |
| 5,436,419 A * | 7/1995 | Welscher | F16H 61/4069 200/61.85 |
| 6,119,456 A * | 9/2000 | Louis | F04B 49/002 60/443 |
| 6,755,703 B1 | 6/2004 | Erickson | |
| 7,003,950 B1 | 2/2006 | Holder et al. | |
| 7,082,759 B1 * | 8/2006 | Tsukamoto | A01D 69/03 60/456 |
| 7,503,172 B2 * | 3/2009 | Sakakura | B60K 17/10 180/242 |
| 7,533,753 B2 | 5/2009 | Tsukamoto et al. | |
| 7,708,531 B2 * | 5/2010 | Sakikawa | F04B 1/2014 417/269 |
| 8,337,353 B2 * | 12/2012 | Iwaki | F16H 47/04 475/302 |
| 8,469,164 B2 | 6/2013 | Kondo et al. | |
| 8,517,138 B2 * | 8/2013 | Sashikuma | B60K 17/356 180/307 |
| 9,211,793 B2 * | 12/2015 | Yasuda | A01D 34/69 |
| 9,549,504 B2 | 1/2017 | Iida et al. | |
| 2004/0011195 A1 * | 1/2004 | Okada | F04B 1/324 92/12.2 |
| 2006/0242956 A1 * | 11/2006 | Ohashi | B60K 17/10 60/443 |
| 2012/0198994 A1 | 8/2012 | Choi | |
| 2016/0040691 A1 * | 2/2016 | Matsuura | F16H 61/4069 60/443 |

FOREIGN PATENT DOCUMENTS

| | | |
|---|---|---|
| JP | S61-278654 A | 12/1986 |
| JP | H01-156138 A | 6/1989 |
| JP | H01-289722 A | 11/1989 |
| JP | H 04-041148 U | 4/1992 |
| JP | H06-100278 B | 12/1994 |
| JP | 2001-227641 A | 8/2001 |
| JP | 2002-031037 A | 1/2002 |
| JP | 2002-250437 A | 9/2002 |
| JP | 2009-236186 A | 10/2009 |
| JP | 2009-287657 A | 12/2009 |
| JP | 2013-096449 A | 5/2013 |

OTHER PUBLICATIONS

Notification of Reason for Refusal issued in Japanese Patent Application No. 2014-162729 dated Feb. 6, 2018.

\* cited by examiner

ACTUATOR UNIT FOR CONTROLLING HYDRAULIC PUMP

CROSS-REFERENCE TO RELATED APPLICATIONS

This application is a continuation of U.S. application Ser. No. 14/817,922, filed Aug. 4, 2015, which claims priority to Japanese Patent Applications No. 2014-161495, filed on Aug. 7, 2014, and No. 2014-162729, filed on Aug. 8, 2014.

BACKGROUND OF THE INVENTION

Field of the Invention

The present invention relates to a control mechanism for controlling the output rotary speed and direction of a hydrostatic transmission (hereinafter, "HST"). Especially, the control mechanism is a servomechanism including a servo unit that combines a telescopic (linearly movable) actuator and a valve.

Related Art

As disclosed by JP 2002-250437 A (hereinafter, "D1"), JP H06-100278 B (hereinafter, "D2"), and JP 2013-096449 A (hereinafter, "D3"), an HST used as a transmission for a tractor is usually disposed in a casing that also serves as a vehicle body frame (chassis) of the tractor. Also, as disclosed by D1, D2 and D3, it is well-known that a piston in a hydraulic cylinder serves as the actuator for controlling a position of a movable swash plate of the HST. In this regard, a trunnion shaft serving as a pivot of the movable swash plate is connected to the piston. Especially, each of the hydraulic cylinders disclosed by D2 and D3 is configured as a servomechanism.

With regard to connection of the actuator to the trunnion shaft, in D1, the trunnion shaft has a tip projecting outward from the casing, and an arm is fixed on the tip of the trunnion shaft, and is connected via a link to a tip of a piston rod extended from the hydraulic cylinder disposed outside of the casing. Similarly, in D2, an arm is fixed on a tip of the trunnion shaft projecting outward from the casing. However, a tip of the arm is directly connected to the piston in the hydraulic cylinder without a link. In D3, a part of the casing serves as a housing of the hydraulic cylinder. The piston in the hydraulic cylinder formed in the casing is directly connected to the movable swash plate of the HST in the casing so that the HST and the hydraulic cylinder are assembled together in the casing.

To achieve a simple and compact vehicle body frame, some tractor makers desire the HST to be minimized for its arrangement in the casing serving as the vehicle body frame, and the actuator to be separated from the HST so as to enable its external attachment on the outside of the casing. From this viewpoint, the structure disclosed by D3 does not meet these desires.

If it is premised that the HST is disposed inside of the casing, and the actuator outside of the casing, it is desirable in assembly, maintenanceability, and reduction of parts count and costs that the actuator can be easily connected or disconnected to and from the tip of the trunnion shaft projecting outward from the casing. A space under the step of the tractor on a right or left side of the casing is suggested as one of appropriate spaces for arrangement of such an actuator. However, if the actuator is to be disposed under the step, the actuator must be disposed at a considerably low position so that a sufficient vertical gap between the actuator and the step above the actuator is ensured to facilitate works for connecting or disconnecting the actuator to and from the trunnion shaft, and to prevent the attached actuator from interfering with the step. Such a low position becomes considerably lower than the trunnion shaft. Therefore, as taught or suggested by D1 and D2, a link or an arm is needed to connect the trunnion shaft to the actuator.

If the actuator is a telescopic actuator, such as a piston rod of a hydraulic cylinder, the movement of the actuator is linear while the movement of the arm that rotates centered on the trunnion shaft or the like is circular. Therefore, such a differential movement between the arm and the actuator should be considered when they are connected to each other. This differential movement becomes larger as the distance between the trunnion shaft and the actuator becomes larger. In other words, if a large vertical gap between the actuator and the trunnion shaft is desired to ensure the facility in work for connecting and disconnecting the actuator to and from the trunnion shaft, there should be any configuration for absorbing the differential movement between the arm and the actuator that may become large because of the large vertical gap.

In this regard, D1 discloses a structure that the cylinder serving as the actuator is pivotally connected at the tip of the piston rod thereof to the arm, and at a cylinder bottom thereof to a part of the vehicle (e.g., a frame). During the telescopic movement of the piston rod, the entire cylinder rotates centered on the pivot at the cylinder bottom according to rotation of the arm. D2 discloses a structure that a groove or a slot is provided in a portion of the piston of the servomechanism to the tip of the arm so as to absorb the rotation of the tip of the arm during the sliding movement of the piston.

However, in the case of D1, the part of the vehicle pivotally supporting the cylinder bottom is weighed on or loaded eccentrically because it cantilevers the cylinder, so that it is liable to a twisting stress due to the rotation of the cylinder. If the actuator is assembled with a valve so as to constitute a servo unit, especially, if the valve is a large and heavy solenoid valve, the part pivoting the cylinder bottom further tends to be twisted. In the case of D2, the portion of the piston engaged with the tip of the arm is complicated in structure. It needs accurate dimensions to surely absorb the differential movement between the piston and the arm while ensuring a stable telescopic movement of the piston and a stable rotation of the arm. Further, the slot or groove has to be formed. As a result, the cost of the configuration of D2 becomes great. Moreover, in the case of D2, the actuator is a twin rod piston. While the piston engages with the tip of the arm, the actuator unit including the valve and the piston has to be supported by attaching both tips of the piston rods to the casing of the HST, thereby increasing the number of positions and processes for attaching or detaching the actuator unit.

Moreover, it is desirable that the servo unit is minimized as much as possible. However, the actuator needs a biasing means that biases the actuator to a position corresponding to a neutral position of the movable swash plate, i.e., a neutral position of the HST. The existence of the biasing means hinders the servo unit from being minimized.

SUMMARY OF THE INVENTION

An object of the invention is to provide a simple configuration to ensure an accurate and stable interlocking connection between a telescopic movement of an actuator of an HST control mechanism, e.g., a servomechanism, and a rotational movement of a trunnion shaft of a movable swash plate of the HST even if the servo unit that should be separated from the HST is distant from the trunnion shaft. Moreover, in the case where the HST control mechanism includes a servo unit as combination of the actuator and a valve, minimization of the servo unit and facility in attachment and detachment of the servo unit are also included in the object of the invention.

A control mechanism for controlling a displacement of an HST includes a rotary member, a servo unit, and a first pivot. The rotary member for controlling the displacement of the HST is pivoted outside of a casing incorporating the HST. The servo unit includes a telescopically movable actuator and a valve controlling the telescopic movement of the actuator. The actuator is interlockingly connected to the rotary member. The servo unit is pivotally supported on the casing via the first pivot. The servo unit rotates centered on the first pivot as the rotary member rotates according to the telescopic movement of the actuator hydraulically controlled by the valve.

Therefore, the rotation of the servo unit surely converts the telescopic linear movement of the actuator to the rotational movement of the rotary member without a twisting stress caused by the differential movement between the telescopic linear movement of the actuator and the rotational movement of the rotary member. Moreover, due to the first pivot pivoting the servo unit, the unification of the actuator and the valve assembled together as the servo unit is ensured so as to improve assembly of the actuator and the valve and so as to ensure facilitation of the servo unit in its attachment and detachment.

Preferably, the first pivot is located in the telescopic movement direction of the actuator so as to coincide to a position corresponding to a neutral state of the HST.

Therefore, while the servo unit is rotated in response to the telescopic movement of the actuator, the servo unit weight balance is improved and the rotation degree required for the servo unit is reduced.

Preferably, the control mechanism further includes a telescopic member and a second pivot. The telescopic member is interlockingly connected to the rotary member. The telescopic member is pivotally supported on the casing via the second pivot. The telescopic member is provided with a biasing device biasing the telescopic member and the rotary member toward a position corresponding to a neutral state of the HST. The telescopic member moves telescopically and rotates centered on the second pivot as the rotary member rotates according to the telescopic movement of the actuator hydraulically controlled by the valve. When the HST returns to the neutral state, due to the biasing force of the biasing device, the telescopic member moves telescopically and rotates centered on the second pivot so as to rotate the rotary member, whereby the servo unit rotates centered on the first pivot and the actuator returns to the position corresponding to the neutral state of the HST.

Therefore, the servo unit includes no biasing device, thereby being improved in minimization and reduction of costs. Moreover, the existing telescopic member for rotating a trunnion shaft can be applied as the telescopic member provided with the biasing device. Only if the servo unit including no biasing device is additionally provided, the entire HST control mechanism is configured as an assembly of the actuator and the valve having the function to return the HST to the neutral state.

Further preferably, the rotary member further comprises a first arm, a second arm, and a link connecting the first arm to the second arm. The first arm is pivoted on the casing via a trunnion shaft of a movable swash plate of the HST. The second arm is pivoted on the casing via a pivotal shaft other than the trunnion shaft. The telescopic member is pivotally connected to the first arm. The actuator is pivotally connected to the second arm.

Therefore, the existing arm, which is pivoted on the casing rotatably centered on the trunnion shaft, and which is pivotally connected to the existing telescopic member provided with the biasing device can be applied as the first arm. When the servo unit is attached, the first and second arm and the link can easily be provided as the rotary member interlockingly connected to both the telescopic member provided with the biasing device and the actuator of the servo unit only if the second arm is added to be pivoted on the casing and to be connected to the first arm via the link.

These and other objects, features and advantages of the invention will appear more fully from the following detailed description of the invention with reference to the attached drawings.

DETAILED DESCRIPTION OF THE INVENTION

Figure 1:
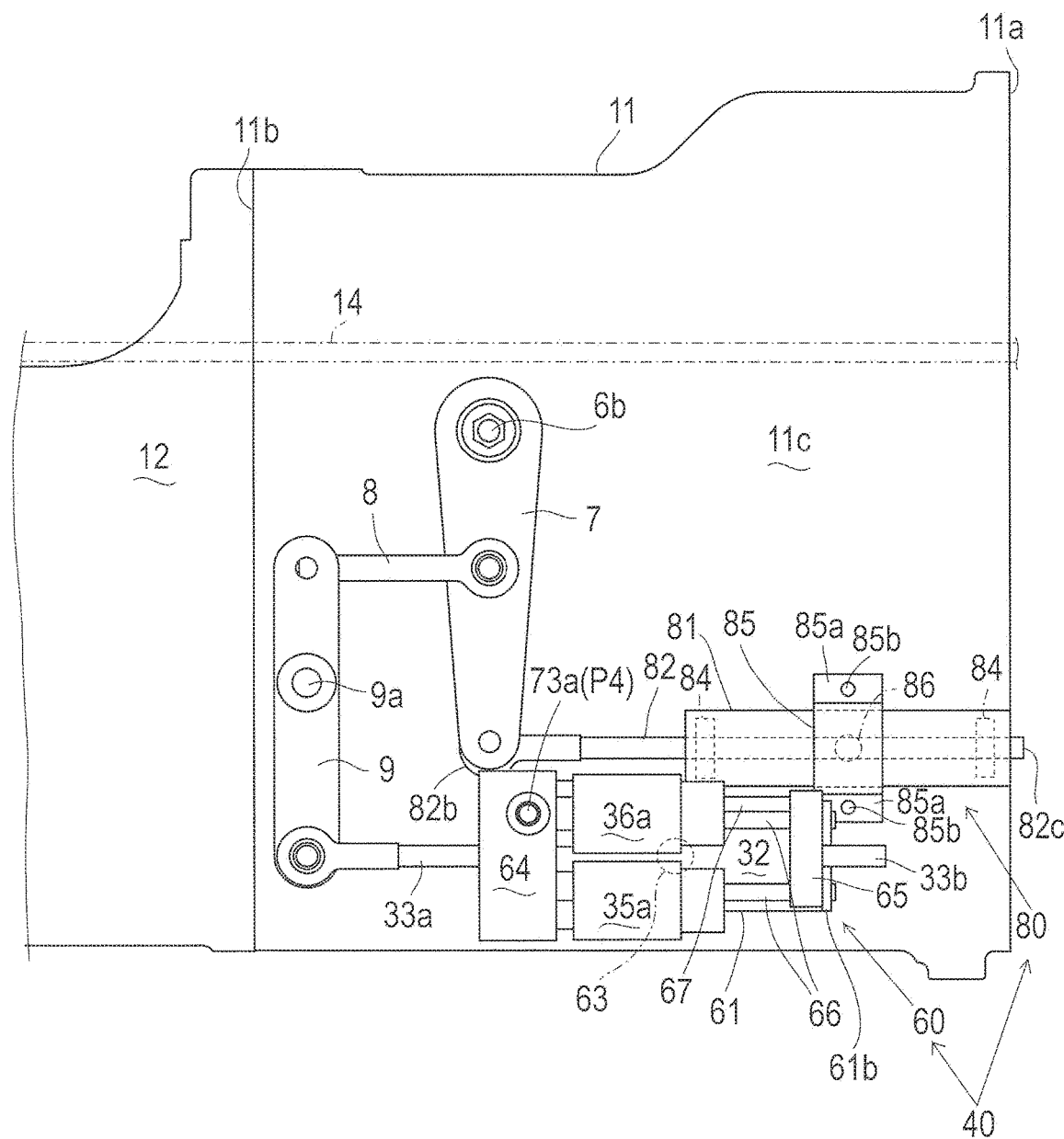
FIG. 1 is a side view of a vehicle frame casing 11 to which a servo set 40 according to a first embodiment is attached.
Figure 2:
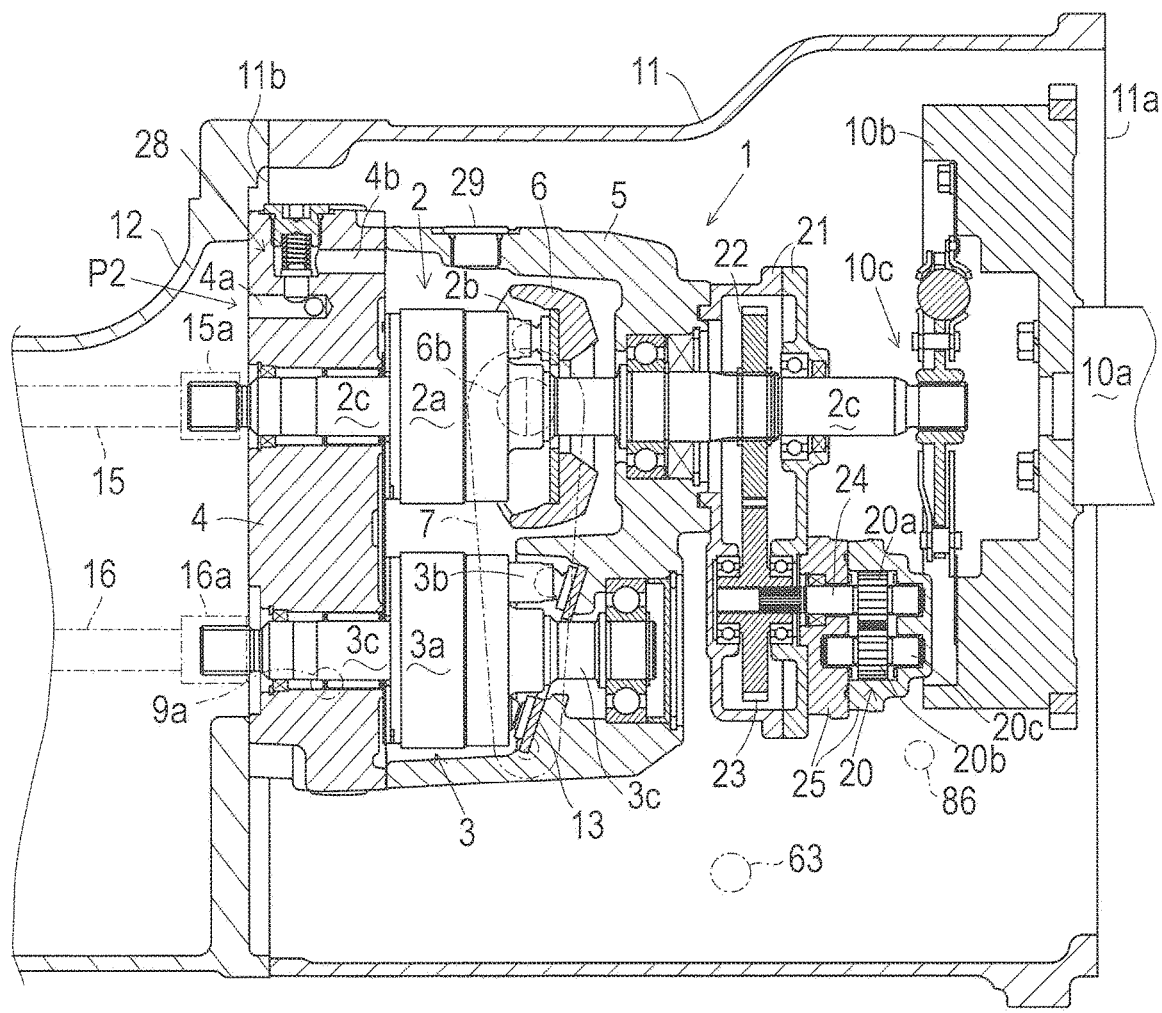
FIG. 2 is a sectional side view of vehicle frame casing 11 showing a structure of an HST 1 therein.

A first embodiment about an HST control mechanism (servomechanism) serving as an actuator device for controlling a movable swash plate of an HST will be described with reference to FIGS. 1 to 13. Referring to FIGS. 1 and 2, an HST 1, a vehicle frame casing 11 and an axle casing 12 will be described. Vehicle frame casing 11 is a casing formed to serve as a vehicle body frame (chassis). Vehicle frame casing 11 incorporates HST 1 serving as a unit for changing a speed of a vehicle such as a tractor. Vehicle frame casing 11 has front and rear open ends. One of the front and rear end open ends of HST 1 (in this embodiment, the front open end) is an open end 11a, which is joined to an end portion (in this embodiment, a rear end portion) of an engine 10 (see FIG. 13). The other of the front and rear ends of HST 1 is an open end 11b, which is joined to an end portion (in this embodiment, a front end portion) of axle casing 12. Hereinafter, positions and directions of all component elements of the first embodiment and a later-discussed second embodiment are defined on the assumption that vehicle frame casing 11 has front open end 11a and rear open end 11b.

Axle casing 12 journals an axle (not shown) and incorporates a transmission for driving the axle. This transmission transmits power outputted from HST 1 to the axles. The transmission may include a speed-changing mechanism (e.g., a gear transmission). In this case, HST 1 serves as a main speed-changing transmission, and the transmission in axle casing 12 serves as a sub speed-changing transmission.

Vehicle frame casing 11 and axle casing 12 joined to each other serve as a vehicle body frame, which is disposed at a laterally middle portion of a vehicle such as a tractor, for example. Referring to FIG. 1 (and FIG. 2 illustrating another embodiment), this vehicle body frame is fixedly provided on right and left ends thereof with left and right steps 13 and 14 made of horizontal plates, which are used for an operator's getting on and off the vehicle, and as a foot rest for an operator sitting on a seat. A servo set (servomechanism) 50 for controlling a later-discussed movable swash plate of HST 1 is disposed under one of steps 13 and 14 (in this embodiment, step 14. See FIG. 15 or others illustrating the second embodiment).

HST 1 includes a hydraulic pump 2, a hydraulic motor 3, a center section 4, an HST housing 5, a charge pump 20 and others, which are assembled together into a unit defined as HST 1. In this embodiment, center section 4 is shaped as a vertical plate, which is fixed in vehicle frame casing 11 so as to cover rear open end 11b of vehicle frame casing 11. A vertical front surface of center section 4 is formed with a pump mounting surface and a motor mounting surface, which are vertically juxtaposed so that one is above the other. In this embodiment, the pump mounting surface is disposed above the motor mounting surface. A cylinder block 2a of hydraulic pump 2 is rotatably slidably mounted onto the pump mounting surface, and a cylinder block 3a of hydraulic motor 3 onto the motor mounting surface. A valve plate may be interposed between each cylinder block 2a or 3a and the pump or motor mounting surface. HST housing 5 is extended forward from center section 4 so as to cover hydraulic pump 2 and hydraulic motor 3 at upper, lower, right, left and front sides of hydraulic pump 2 and motor 3.

Referring to FIG. 2, a front wall of HST housing 5 is disposed forward from hydraulic pump 2 and motor 3. A movable swash plate 6 of hydraulic pump 2 is disposed adjacent to an upper portion of the front wall of HST housing 5. Movable swash plate 6 is a trunnion-type movable swash plate having later-discussed lateral trunnion shafts pivoted by right and left side walls of HST housing 5, and abuts against heads (front ends) of plungers 2b projecting forward from cylinder block 2a. A later-discussed pump shaft 2c is extended forward from movable swash plate 6, is journalled by an upper portion of the front wall of HST housing 5, and is extended forward from HST housing 5 to as to be drivingly connected to a later-discussed flywheel 10b. On the other hand, a fixed swash plate 6 of hydraulic motor 3 is fixed to a lower portion of the front wall of HST housing 5 so as to abut against heads of plungers 3b projecting forward from cylinder block 3a.

Movable swash plate 6 includes right and left trunnion shafts serving as a fulcrum axis for rotation of movable swash plate 6. Right and left trunnion shafts are journalled by right and left walls of HST housing 5. Of the trunnion shafts, one trunnion shaft 6b projects outward from HST housing 5, and has an end portion projecting outward from a right or left (in this embodiment, right) outer side surface 11c of vehicle frame casing 11 just below step 14. A first arm 7 is fixed at a top portion thereof to the end portion of trunnion shaft 6b. First arm 7 is extended downward along the outer side surface of vehicle frame casing 11, and has a lower end portion to which a rear end portion 82b of a rod 82 extended rearward from a cylindrical member 81 of a neutral returning unit 80.

A second arm 9 is disposed rearward from first arm 7 outside of vehicle frame casing 11, and is extended along outer side surface 11c of vehicle frame casing 11. Second arm 9 has a pivot shaft 9a at a vertically intermediate portion thereof so as to be pivoted onto outer side surface 11c of vehicle frame casing 11 via pivot shaft 9a. Second arm 9 is pivotally connected at a top portion thereof to a vertically intermediate portion of first arm 7 via a link 8. A tip (i.e., rear end) of a piston rod 33a extended rearward from a servo cylinder 32 of a servo unit 60 is pivotally connected to a lower end portion of second arm 9. Servo unit 60 and a neutral returning unit 80 are assembled together so as to constitute a servo set (i.e., servomechanism) 40 for controlling movable swash plate 6 of hydraulic pump 2. In this regard, first arm 7, link 8 and second arm 9 serve as a rotary member, to which a piston rod 33a of a piston 33 serving as a telescopic actuator of servo unit 60 and an end portion 82b of a rod 82 serving as a telescopic member of neutral returning unit 80 are pivotally connected. Neutral returning unit 80 includes a neutral returning spring 83 serving as a biasing device. Neutral returning spring 83 biases rod 82 toward its neutral position corresponding to a neutral position of movable swash plate 6.

Due to a fore-and-aft telescopic movement of piston rod 33a of servo unit 60, second arm 9 rotates centered on pivot shaft 9a. Accordingly, first arm 7 connected to second arm 9 via link 8 rotates centered on an axis of trunnion shaft 6b, thereby rotating movable swash plate 6 of hydraulic pump 2, because trunnion shaft 6b of movable swash plate 6 is fixed to first arm 7. Further, due to the telescopic movement of piston rod 33a and the rotation of second arm 9, first arm 7 rotates so as to move rod 82 telescopically against the biasing force of spring 83. In servo unit 60, proportional pressure control valves 35 and 36 can be controlled to apply an operation force to piston rod 33a. Once piston rod 33a is released from the operation force, rod 82 returns to the neutral position defined by the biasing force of spring 83, thereby returning first arm 7 and movable swash plate 6 to their neutral positions. Due to the movement of first arm 7 to its neutral position, second arm 9 is rotated via link 8 so that piston rod 33a returns to a position in the telescopic movement direction (fore-and-aft direction) of piston rod 33a corresponding to the neutral position of movable swash plate 6 with trunnion shafts 6a.

Hydraulic pump 2 includes a fore-and-aft horizontal pump shaft 2c serving as a rotary axis of cylinder block 2a. Hydraulic motor 3 includes a fore-and-aft horizontal motor shaft 3c serving as a rotary axis of cylinder block 3a. Pump shaft 2c and motor shaft 3c are journalled by center section 4. Rear end portions of pump shaft 2c and motor shaft 3c project rearward from center section 4 into axle casing 12. In axle casing 12, a front end portion of a PTO shaft or a front end portion of a PTO transmission shaft 15 interlocking with the PTO shaft is connected via a coupling 15a to the rear end portion of pump shaft 2c. On the other hand, in axle casing 12, a front end portion of an input shaft 16 of the transmission in axle casing 12 is connected via a coupling 16a to the rear end portion of motor shaft 3c serving as an output shaft of HST 1.

In vehicle frame casing 11, a gear casing 21 is fixed to a front end of HST housing 5. A front portion of pump shaft 2c projects forward from the front wall of HST housing 5 through gear housing 21. After engine 10 is joined to front open end 11a of vehicle frame casing 11, a fore-and-aft horizontal engine output shaft 10a of engine 10 is extended into vehicle frame casing 11 via front open end 11a, so that a flywheel 10b provided at a rear end portion of engine 10 is disposed in a front inside space in vehicle body frame 11. Pump shaft 2c serving as an input shaft of HST 1 projects forward from gear housing 21 as mentioned above, so that a front end portion of pump shaft 2c is connected to flywheel 10b via a damper 10c.

In gear casing 21, pump shaft 2c is journalled at a fore-and-aft intermediate portion thereof, and a charge pump driving shaft 24 is extended parallel to pump shaft 2c and is journalled. In gear casing 21, a gear 22 is fixed on the fore-and-aft intermediate portion of pump shaft 2c, and a gear 23 is fixed on charge pump driving shaft 24. Gears 22 and 23 mesh with each other so as to constitute a gear train for transmitting power from pump shaft 2c to charge pump driving shaft 24. A pump housing 26 incorporating charge pump 20 is fixed to a front end of gear casing 21 so as to extend parallel to the front portion of pump shaft 2c projecting forward from gear housing 21. Charge pump driving shaft 24 projects forward from gear casing 21 into pump housing 25. In pump housing 25, a pump driven shaft 20c parallel to charge pump driving shaft 24 is journalled. In pump housing 25, a pump gear 20a fixed on charge pump driving shaft 24 and a pump gear 20b fixed on pump driven shaft 20c mesh with each other so as to constitute a gear pump serving as charge pump 20.

Figure 13:
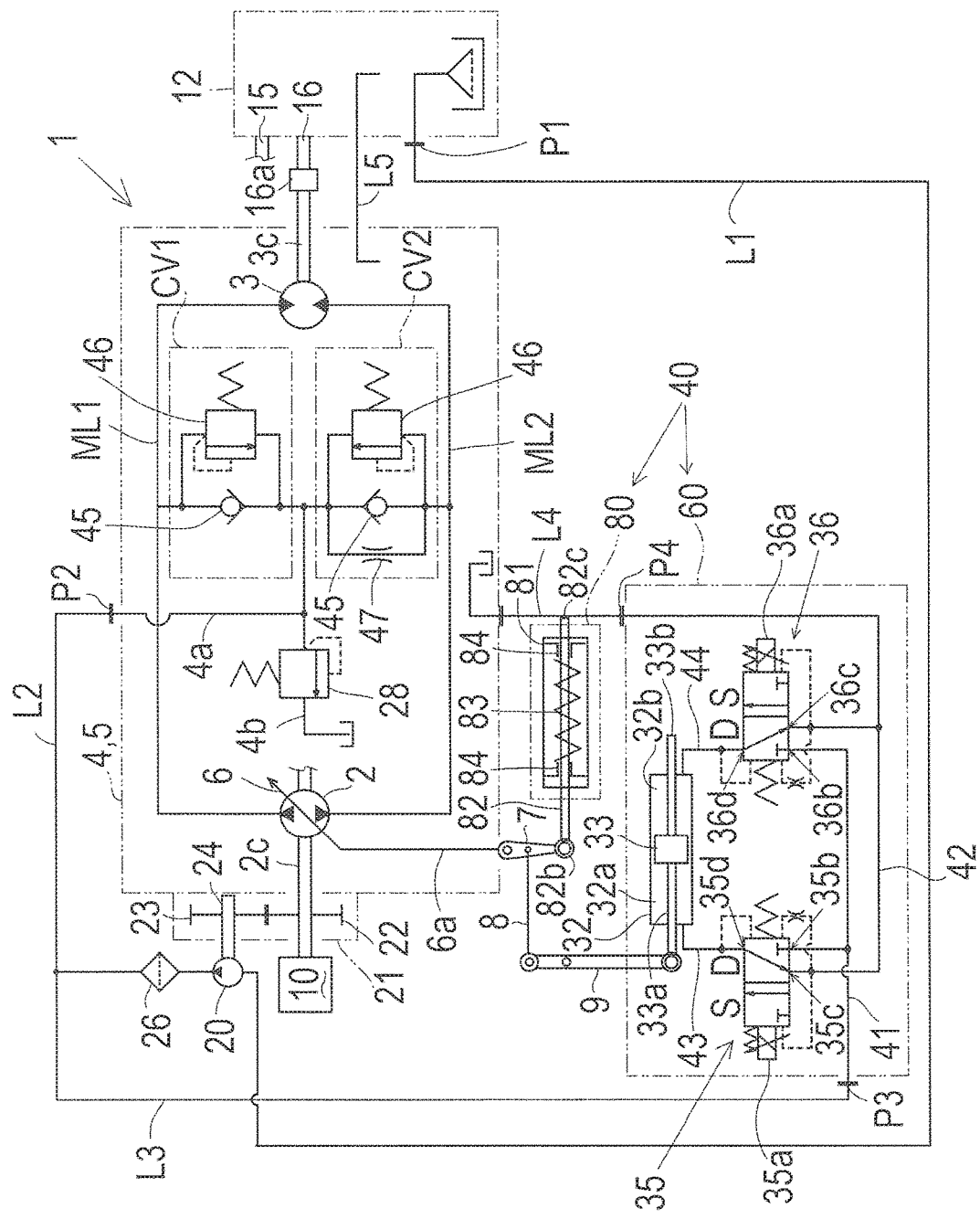
FIG. 13 is a hydraulic circuit diagram for supplying fluid to HST 1 and servo set 40.

Referring to FIGS. 2 and 13, a hydraulic fluid supply system for supplying fluid from charge pump 20 to HST 1 will be described. Charge pump 20 sucks fluid from a fluid sump in axle casing 12. In this regard, axle casing 12 has a fluid discharge port P1. Fluid of the fluid sump in axle casing 12 is taken out of axle casing 12 via fluid discharge port P1 and is sucked to a suction port of charge pump 20 disposed in vehicle frame casing 11 via a fluid passage L1. Fluid passage L1 may be formed within a wall of vehicle frame casing 11, or may be made of pipes disposed outside of casings 11 and 12, for example.

Fluid delivered from a delivery port of charge pump 20 is taken out of vehicle frame casing 11 again, and is supplied into a charge fluid passage 4a formed in center section 4 via a line filter 26, a fluid passage L2 and a charge port P2. In the embodiment shown in FIG. 2, charge fluid passage 4a has an open end serving as charge port P2 at a rear end surface of center section 4, and fluid passage L2 is connected to charge port P2.

A relief valve 28 is provided in center section 4 so as to adjust a hydraulic pressure of fluid in charge fluid passage 4a of center section 4. Fluid released from relief valve 28 is drained into a chamber in HST housing 5 forward from center section 4 via a drain fluid passage 4b formed in center section 4. Referring to FIG. 1, HST housing 5 has a drain port for draining fluid from the inside of HST housing 5. This drain port is normally plugged with a drain cap 29, as shown in FIG. 2. Fluid from the drain port is drained to the fluid sump in HST housing 5 or vehicle frame casing 11. This fluid sump may be fluidly connected to a fluid sump in axle casing 12 via a fluid passage L5, as shown in FIG. 13.

Referring to FIG. 13, center section 4 is formed therein with a pair of main fluid passages ML1 and ML2 that are interposed between hydraulic pump 2 and hydraulic motor 3. Center section 4 is provided therein with a pair of charge valve units CV1 and CV2. The fluid in charge fluid passage 4a has a hydraulic pressure regulated by relief valve 28. When main fluid passage ML1 is hydraulically depressed, a check valve 45 in charge valve unit CV1 is opened so that the fluid in charge fluid passage 4a is supplied to main fluid passage ML1 via opened check valve 45 in charge valve unit CV1. When main fluid passage ML2 is hydraulically depressed, a check valve 45 in charge valve unit CV2 is opened so that the fluid in charge fluid passage 4a is supplied to main fluid passage ML2 via opened check valve 45 in charge valve unit CV2. Each of charge valve units CV1 and CV2 includes a relief valve 46 that bypasses corresponding check valve 45 so as to regulate the hydraulic pressure in corresponding main fluid passage ML1 or ML2.

One of charge valve units CV1 and CV2 includes an orifice 47 bypassing corresponding check valve 17 so that orifice 47 functions to expand a neutral region of HST 1. If main fluid passage ML2 is designated to have a higher hydraulic pressure than that of main fluid passage ML1 during backward traveling of the vehicle, preferably, charge valve unit CV2 for supplying fluid to main fluid passage ML2 has orifice 47.

Referring to the hydraulic circuit diagram of FIG. 13, a general configuration of servo set 40 and a fluid supply system for supplying fluid from charge pump 20 to servo unit 60 of servo set 40. A delivery fluid passage from charge pump 20 passes line filter 26 and then is bifurcated into fluid passages L2 and L3. Fluid passage L2 is extended into HST 1. Fluid passage L3 is extended to servo unit 60. In this way, charge pump 20 supplies hydraulic fluid to both HST 1 and servo unit 60 for controlling movable swash plate 6 of HST 1.

Servo unit 60 includes a hydraulic cylinder 32 and proportional pressure control valves 35 and 36. Piston 33 serving as the actuator for controlling the position of movable swash plate 6 is slidably fitted in hydraulic cylinder 32. Opposite piston rods 33a and 33b are extended from piston 33 and project outward from opposite ends of hydraulic cylinder 32. The tip of piston rod 33a is pivotally connected to second arm 9 as mentioned above.

Proportional pressure control valve 35 is adapted to supply or discharge fluid to and from a fluid chamber 32a formed in hydraulic cylinder 32 on one side of piston 33. Proportional pressure control valve 36 is adapted to supply or discharge fluid to and from a fluid chamber 32b formed in hydraulic cylinder 32 on the other side of piston 33. Proportional pressure control valves 35 and 36 are proportional solenoid valves provided with respective proportional solenoids 35*a* and 36*a*. Proportional pressure control valve 35 has a valve port 35*d* fluidly connected to fluid chamber 32*a* in hydraulic cylinder 32 via a hydraulic fluid passage 43. Proportional pressure control valve 36 has a valve port 36*d* fluidly connected to fluid chamber 32*b* in hydraulic cylinder 32 via a hydraulic fluid passage 44. One of proportional pressure control valves 35 and 36 is designated so as to be excited during forward traveling of the vehicle, and the other of proportional pressure control valves 35 and 36 so as to be excited during backward traveling of the vehicle. Either proportional pressure control valve 35 or 36, which is excited, supplies fluid from its valve port 35*d* or 36*d* to corresponding fluid chamber 32*a* or 32*b* via corresponding hydraulic fluid passage 43 or 44.

Servo unit 60 has an inlet port P3 and an outlet port P4. Inlet port P3 receives fluid delivered from charge pump 20 via fluid passage L3. Outlet port P4 is fluidly connected to the fluid sump in vehicle frame casing 11 via a fluid passage L4. Proportional pressure control valves 35 and 36 have respective suction ports 35*b* and 36*b* and respective drain ports 35*c* and 36*c*. The fluid introduced into servo unit 60 from fluid passage L3 via inlet port P3 is supplied to suction ports 35*b* and 36*b* of respective proportional pressure control valves 35 and 36. A drain fluid passage 42 extended to outlet port P4 collects fluid from both drain ports 35*c* and 36*c* of proportional pressure control valves 35 and 36 so as to drain the collected fluid to the fluid sump in vehicle frame casing 11 via outlet port P4 and fluid passage L4 outside of servo unit 60.

Each of the proportional solenoid valves serving as proportional pressure control valves 35 and 36 has a movable member such as a spool. Each of proportional solenoids 35*a* and 36*a* has a driving force to drive the movable member in the direction against the spring force (i.e., the biasing force of spring 83 of neutral returning unit 80) and the hydraulic pressure, and controls the position of the movable member so as to balance the movable member against the spring force and the hydraulic pressure, thereby controlling the flow and pressure of fluid through corresponding proportional pressure control valve 35 or 36. The driving force of each of proportional solenoids 35*a* and 36*a* is proportional to a current (cutoff current) value applied on proportional solenoid 35*a* or 36*a*. Referring to FIG. 13, each of proportional pressure control valves 35 and 36 is vibratorily shifted between a supply position S and a drain position D in correspondence to the current value applied on its proportional solenoid 35*a* or 36*a*.

Each of proportional pressure control valves 35 and 36, when it is set at supply position S, fluidly connects its valve port 35*d* or 36*d* to its suction port 35*b* or 36*b* so that fluid introduced to suction port 35*b* or 36*b* via inlet port P3 is supplied to corresponding fluid chamber 32*a* or 32*b*. Each of proportional pressure control valves 35 and 36, when it is set at drain position D, fluidly connects its valve port 35*d* or 36*d* to its drain port 35*c* or 36*c* so that fluid introduced to valve port 35*d* or 36*d* from corresponding fluid chamber 32*a* or 32*b* is supplied to corresponding fluid chamber 32*a* or 32*b*. The vibratory shift of each of proportional pressure control valves 35 and 36 between supply position S and drain position D means a repeat of alternate supply and drain of fluid to and from corresponding fluid chamber 32*a* or 32*b*. Due to such repeated supply and drain of fluid, a hydraulic pressure in corresponding fluid chamber 32*a* or 32*b* is set so that piston 33 is stroked to a position where the hydraulic pressure is balanced against pressure in the other fluid chamber 32*a* or 32*b* and the biasing force of spring 83 the biasing force of spring 83. Incidentally, a controller (not shown) creates the current value in correspondence to an operation degree of a speed control manipulator (not shown) such as a pedal or a lever.

The description of servo set 50 with reference to FIG. 13 is ended. Now, configurations of servo unit 60 and neutral returning unit 80 in servo set 50 will be described in detail with reference to FIGS. 1 to 12. As mentioned above, servo unit 60 and neutral return unit 80 are disposed outside of vehicle frame casing 11 so as to extend along outer side surface 11*c* of vehicle frame casings 11. Hereinafter, with regard to the lateral direction of servo unit 60 and neutral returning unit 80, a side close to outer side surface 11*c* is referred to a "laterally proximal" side, and a side away from (opposite) outer side surface 11*c* is referred to a "laterally distal" side.

Figure 3:
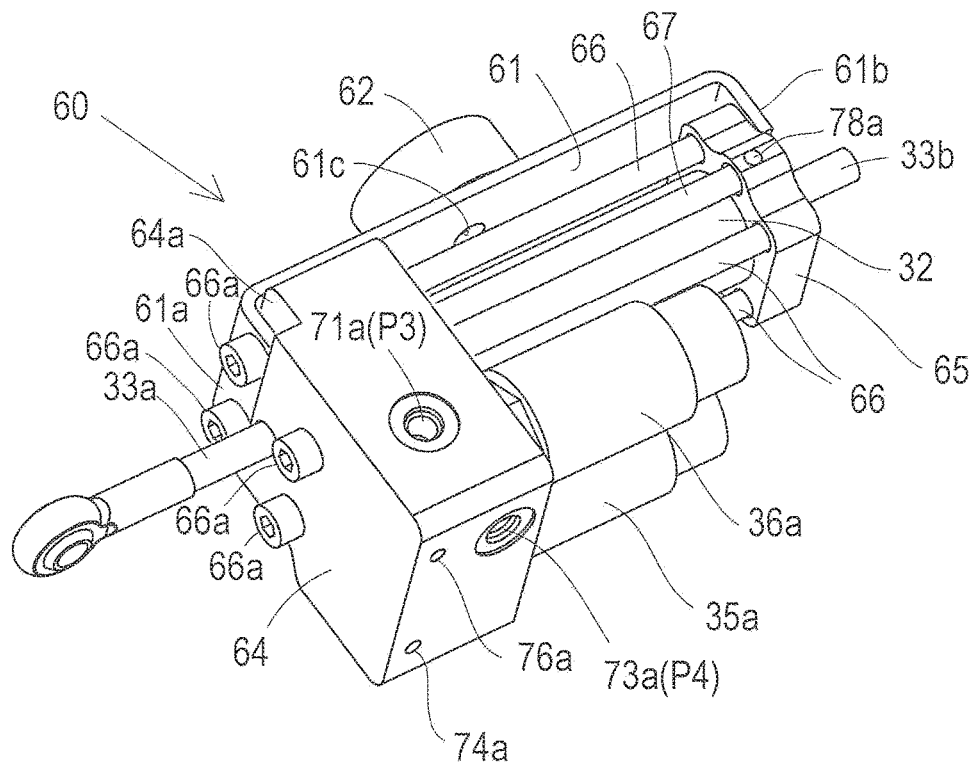
FIG. 3 is a perspective view of a servo unit 60.
Figure 4:
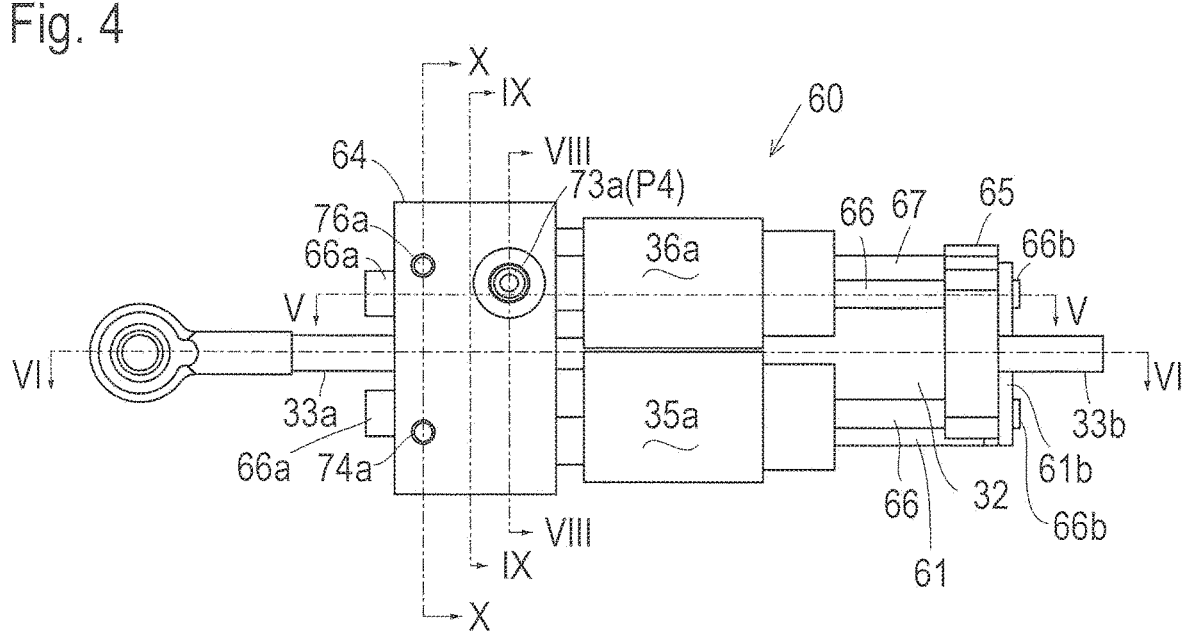
FIG. 4 is a side view of servo unit 60.
Figure 5:
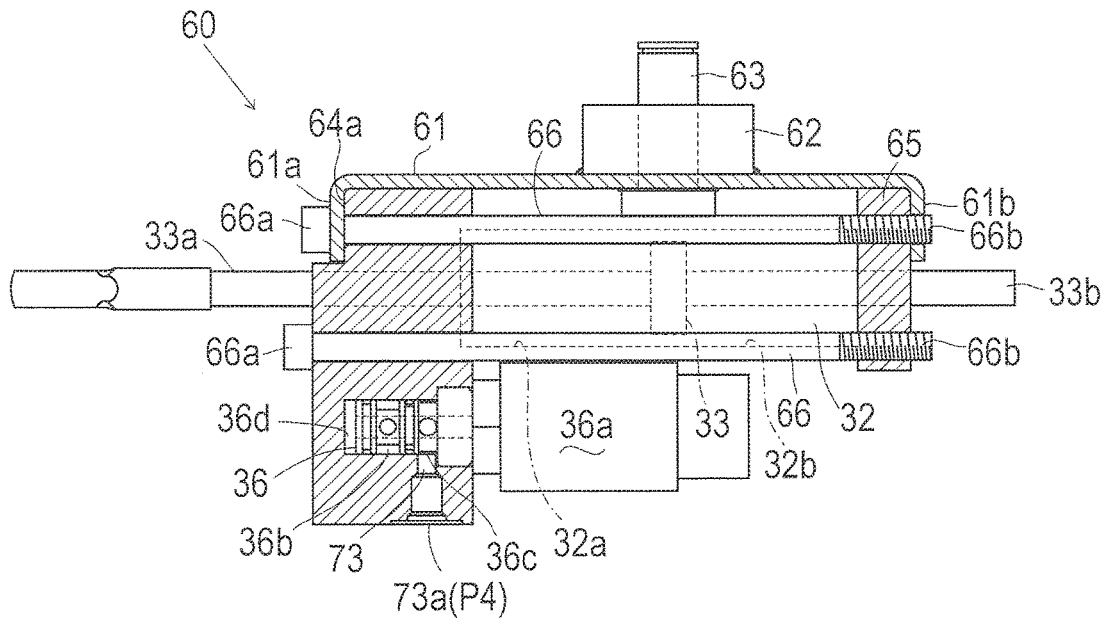
FIG. 5 is a cross sectional view taken along V-V line of FIG. 4.
Figure 6:
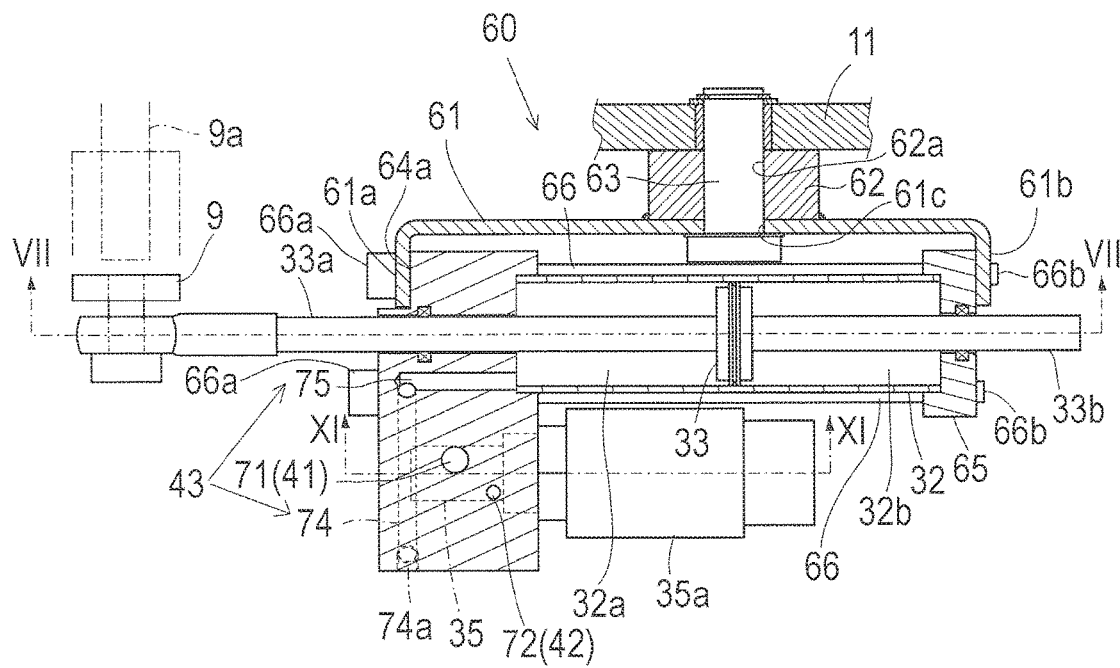
FIG. 6 is a cross sectional view taken along VI-VI line of FIG. 4.

Referring to FIGS. 1 to 11, the configuration of servo unit 60 will be described. Servo unit 60 includes a bracket 61, a valve block 64 and a fluid duct block 65. As shown in FIGS. 3 and 6, bracket 61 is a plate-shaped member, which is extended in the fore-and-aft direction along outer side surface 11*c* of vehicle frame casing 11. Bracket 61 has a rear end portion 61*a* and a front end portion 61*b*, which are bent to the laterally distal side. Referring to FIGS. 3, 6 and 8 to 10, a sleeve-shaped boss 62 is fixed on a fore-and-aft middle portion of bracket 61 between rear and front end portions 61*a* and 61*b* and is extended to the laterally proximal side. Referring to FIGS. 3 and 6, bracket 61 is formed therethrough with a boss hole 61*c*, and boss 62 is formed therethrough with a boss hole 62*a*.

Referring to FIG. 6, a pivot shaft 63 is passed at a laterally distal portion thereof through boss holes 61*c* and 62*a*. Pivot shaft 63 is inserted at a laterally proximal end portion thereof into vehicle frame casing 11 through outer side surface 11*c* so as to be retained in vehicle frame casing 11. In other words, bracket 61 is pivoted at the fore-and-aft middle portion thereof on vehicle frame casing 11 via the proximally distal portion of laterally horizontal pivot shaft 63 projecting outward from outer side surface 11*c* of vehicle frame casing 11. Therefore, rear end portion 61*a* and front end portion 61*b* of bracket 61 are able to vertically oscillate centered on pivot shaft 63.

Referring to FIGS. 3, 5, 6 and 10, valve block 64 is formed with a stepped surface 64*a*, which contacts rear end portion 61*a* of bracket 61. On the other hand, referring to FIGS. 1 and 3 to 7, fluid duct block 65 contacts front end portion 61*b* of bracket 61 at a front end surface thereof. Referring to FIGS. 1 and 3 to 10, hydraulic cylinder 32 is sandwiched between valve block 63 and fluid duct block 65. Four connection rods 66 are disposed so as to surround hydraulic cylinder 32, and are extended parallel to hydraulic cylinder 32. Four connection rods 66 consist of a pair of right and left connection rods 66 above hydraulic cylinder 32, and a pair of right and left connection rods 66 below hydraulic cylinder 32. In other words, they consist of a pair of upper and lower connection rods 66 on the laterally proximal side of hydraulic cylinder 32 (hereinafter referred to as upper and lower proximal connection rods 66), and a pair of upper and lower connect rods 66 on the laterally distal side of hydraulic cylinder 32 (hereinafter referred to as upper and lower distal connection rods 66).

Referring to FIG. 5, each connection rod 66 is a bolt having a rear end portion formed as a bolt head 66*a*, and a front end portion formed as a threaded shaft portion 66*b*. Each connection rod 66 is inserted forward into valve block 64. In this regard, upper and lower proximal connection rods 66 are inserted into valve block 64 via rear end portion 61*a* of bracket 61 contacting stepped surface 64*a* of valve block 64. Each connection rod 66 has front threaded shaft portion 66b screwed through fluid duct block 65. In this regard, upper and lower proximal connection rods 66 have respective front threaded shaft portions 66b further screwed through front end portion 61b of bracket 61 contacting the front end surface of fluid duct block 65.

As mentioned above, four connection rods 66 are passed through valve block 64 and fluid duct block 65. Upper and lower distal connection rods 66 have respective bolt heads 66a contacting a rear end surface of valve block 64. Upper and lower proximal connection rods 66 have respective bolt heads 66a contacting rear end portion 61a of bracket 61. Therefore, four connection rods 66 fasten valve block 64 and fluid duct block 65 sandwiching hydraulic cylinder 32 therebetween to each other. Further, upper and lower proximal connection rods 66 fasten valve block 64 and fluid duct block 65 to rear and front end portions 61a and 61b of bracket 61. In this way, bracket 61, boss 62, hydraulic cylinder 32, valve block 64, hydraulic block 65 and connection rods 66 are assembled together into servo unit 60, so that they are all rotatably centered on pivot shaft 63. Connection rods 66 are not limited in number, position and so on. The only thing required for connection rods 66 is to be appropriate to assembling of hydraulic cylinder 32, valve block 64 and fluid duct block 65 so that hydraulic cylinder 32, valve block 64 and fluid duct block 65 are integrally rotatable centered on pivotal shaft 63.

Moreover, referring to FIGS. 1, 3 and 4 to 7, a fluid pipe 67 is disposed above hydraulic cylinder 32 and is extended parallel to hydraulic cylinder 32 so as to be interposed between valve block 64 and fluid duct block 65, thereby ensuring a fluid flow between valve block 64 and fluid duct block 65. A configuration of fluid passages, including fluid pipe 67, will be detailed later.

Figure 7:
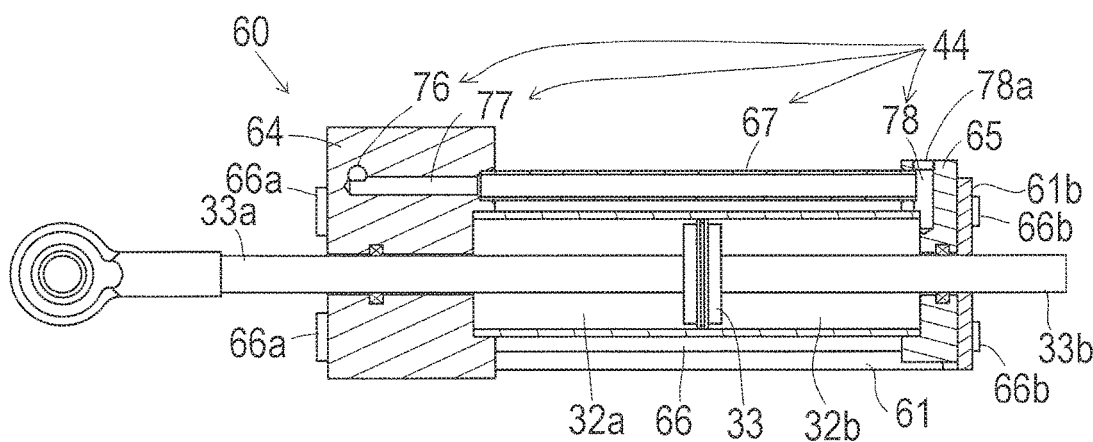
FIG. 7 is a cross sectional view taken along VII-VII line of FIG. 6.

Referring to FIGS. 6 and 7, in this embodiment, the chamber close to the rear end of hydraulic cylinder 32 fixed to valve block 64 serves as fluid chamber 32a, and the chamber close to the front end of hydraulic cylinder 32 fixed to fluid duct block 65 serves as fluid chamber 32b. Piston rod 33a is extended rearward from piston 33 in hydraulic cylinder 32 so as to pass through fluid chamber 32a of hydraulic cylinder 32. Piston rod 33a further passes through valve block 64 and projects rearward from valve block 64 so as to have the rear end portion pivotally connected to the lower end portion of second arm 9 as mentioned above. On the other hand, piston rod 33b is extended forward from piston 33 in hydraulic cylinder 32 so as to pass through fluid chamber 32b of hydraulic cylinder 32. Piston rod 33b further passes through fluid duct block 65 and projects at a front end portion thereof forward from fluid duct block 65.

According to the fore-and-aft slide of piston 33 in hydraulic cylinder 32, piston rod 33a projecting rearward from valve block 64 and piston rod 33b projecting forward from fluid duct block 65 are moved telescopically (linearly). Referring to FIGS. 1 and 13, the linear movement of piston rod 33a causes second arm 9 to rotate centered on pivot shaft 9a. During the rotation of second arm 9, the lower end portion of second arm 9 changes its position in the vertical direction, so that the rear end portion of piston rod 33a pivotally connected to the lower end portion of second arm 9 is oscillated vertically. The vertical oscillation of the rear end portion of piston rod 33a is enabled by the above-mentioned integral rotatability of hydraulic cylinder 32, valve block 64 and fluid duct block 65 centered on pivot shaft 63. In other words, according to the telescopic movement of piston rod 33a, hydraulic cylinder 32, valve block 64 and fluid duct block 56 are integrally rotated centered on pivot shaft 63 so as to prevent second arm 9 pivotally connected to piston rod 33a from being twisted, whereby second arm 9 can rotate according to the telescopic (linear) movement of piston rod 33a.

Valve block 64 further expands to the laterally distal side from the portion thereof connected to hydraulic cylinder 32 and connection rods 66. The laterally distal expanded portion of valve block 64 incorporates proportional pressure control valves 35 and 36 that are juxtaposed upper and lower. In this embodiment, proportional pressure control valve 36 fluidly connected to fluid chamber 32b is disposed above proportional pressure control valve 35 fluidly connected to fluid chamber 32a. Solenoids 35a and 36a of proportional pressure control valves 35 and 36 project forward from the expanded portion of valve block 64 and are extended parallel to hydraulic cylinder 32.

Figure 9:
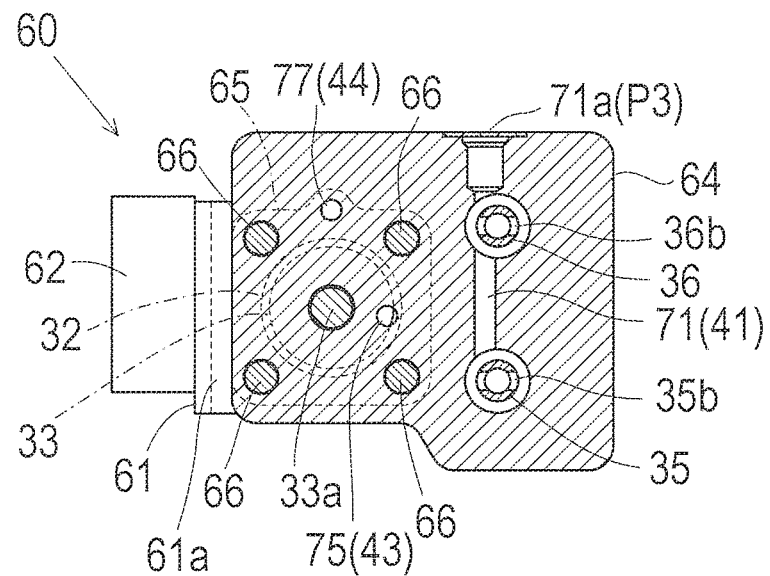
FIG. 9 is a cross sectional view taken along IX-IX line of FIG. 4.
Figure 11:
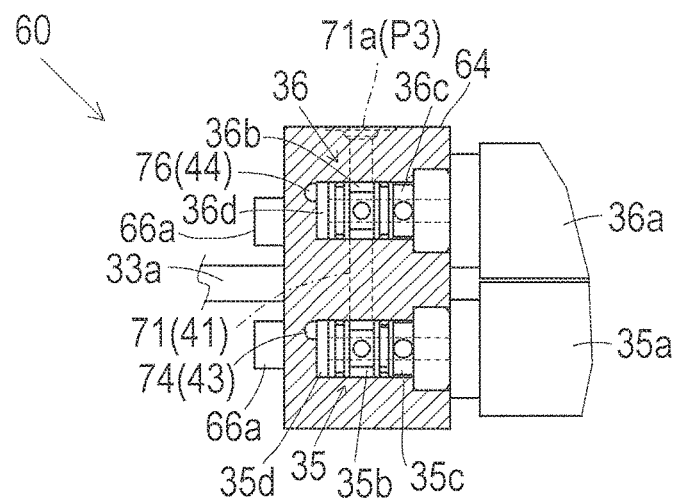
FIG. 11 is a cross sectional view taken along XI-XI line of FIGS. 6 and 7.

Referring to FIGS. 6, 9 and 11, valve block 64 is bored therein with a vertical fluid hole 71. In valve block 64, fluid hole 71 is fluidly connected at a vertically intermediate portion thereof to suction port 36b of proportional pressure control valve 36, and at a lower end portion thereof to suction port 35b of proportional pressure control valve 35. Fluid hole 71 serves as suction fluid passage 41 shown in the hydraulic circuit diagram of FIG. 13. Referring to FIGS. 3, 9 and 11, an upper end 71a of fluid hole 71 is open at a top surface of valve block 64, so that open end 71a of fluid hole 71 serves as inlet port P3 shown in the hydraulic circuit diagram of FIG. 13.

Figure 8:
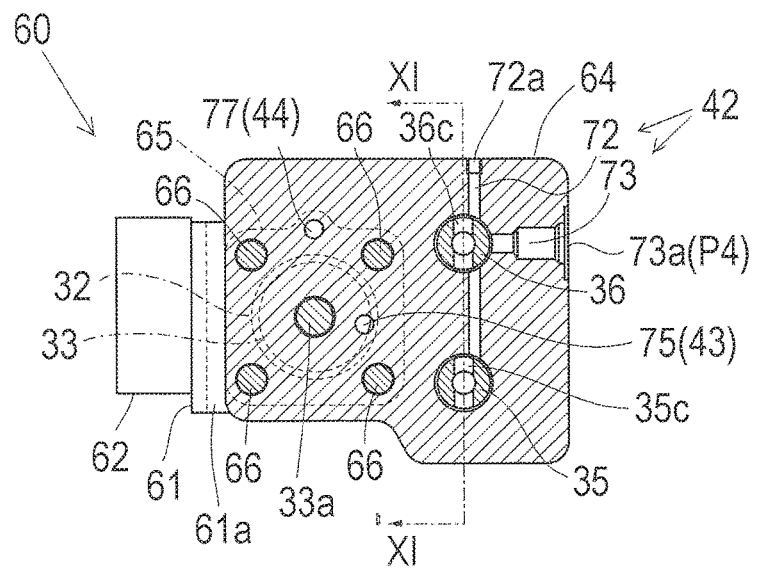
FIG. 8 is a cross sectional view taken along VIII-VIII line of FIG. 4.

Referring to FIGS. 6 and 8, valve block 64 is bored therein with a vertical fluid hole 72. An upper end 72a of fluid hole 72 is disposed at the top surface of valve block 64 and is plugged. Fluid hole 72 is fluidly connected at a vertically intermediate portion thereof to drain port 36c of proportional pressure control valve 36, and at a lower end thereof to drain port 35c of proportional pressure control valve 35. Referring to FIG. 8, valve block 64 is further bored therein with a horizontal fluid hole 73 that is extended laterally distally from a vertically intermediate portion of fluid hole 72. Fluid holes 72 and 73 formed in valve block 64 serve as drain fluid passage 42 shown in the hydraulic circuit diagram of FIG. 13. Referring to FIGS. 1, 3, 4 and 8, fluid hole 73 has a laterally distal end 73a open at a laterally distal side surface of valve block 74, so that open end 73a of fluid hole 73 serves as outlet port P4 in FIG. 13.

Figure 10:
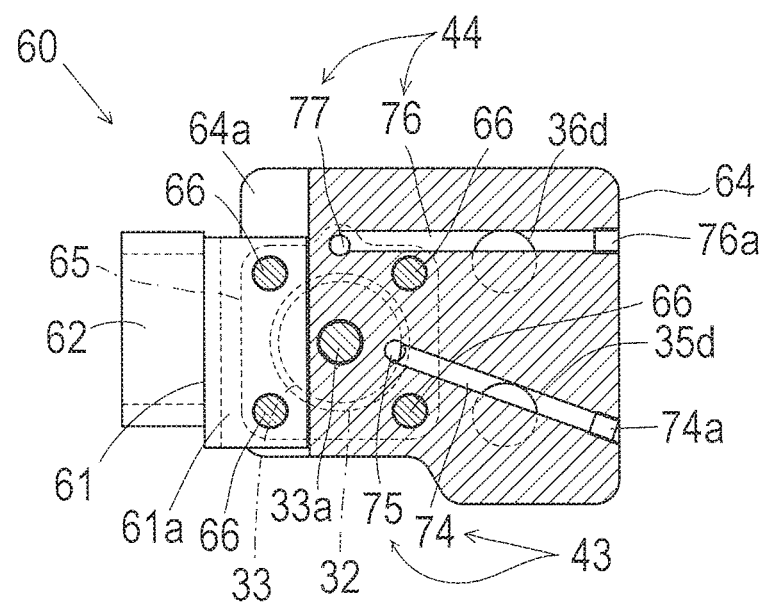
FIG. 10 is a cross sectional view taken along X-X line of FIG. 4.

Referring to FIGS. 6 to 10, valve block 64 is bored in a lower half portion thereof with a vertically slant fluid hole 74 extended laterally along the rear end surface of valve block 64. Referring to FIGS. 3 to 6 and 10, a laterally distal end 74a of fluid hole 74 is disposed at the laterally distal side surface of valve block 64, and is plugged. Fluid hole 74 is fluidly connected at a laterally intermediate portion thereof to valve port 35d of proportional pressure control valve 35. Referring to FIGS. 6 and 8 to 10, valve block 64 is bored therein with a fore-and-aft horizontal fluid hole 75. Referring to FIGS. 6 and 10, a rear end of fluid hole 75 and a laterally proximal end of fluid hole 74 are joined to each other. Referring to FIG. 6, a front end of fluid hole 75 is open at a rear end of fluid chamber 32a in hydraulic cylinder 32. In this way, fluid holes 74 and 75 formed in valve block 64 serve as hydraulic fluid passage 43 that fluidly connects valve port 35d of proportional pressure control valve 35 to fluid chamber 32a of hydraulic cylinder 32 as shown in FIG. 13.

Referring to FIGS. 7, 10 and 11, valve block 64 is bored in an upper half portion thereof with a laterally horizontal fluid hole 76 along the rear end surface of valve block 64. Referring to FIGS. 3, 4 and 10, a laterally distal end 76a of fluid hole 76 is disposed at the laterally distal side surface of valve block 64, and is plugged. Valve hole 76 is fluidly connected at a laterally intermediate portion thereof to valve port 36d of proportional pressure control valve 36. Further, referring to FIGS. 7 to 10, valve block 64 is bored therein with a fore-and-aft horizontal fluid hole 77. Referring to FIGS. 7 and 10, a rear end of fluid hole 77 and a laterally proximal end of fluid hole 76 are joined to each other. On the other hand, as mentioned above, fluid pipe 67 is interposed between valve block 64 and fluid duct block 65. Referring to FIG. 7, a rear open end portion of fluid pipe 67 is fitted into valve block 64 and is joined to a front open end of fluid hole 77.

Referring to FIG. 7, fluid duct block 65 is bored therein with a vertical fluid hole 78. Referring to FIGS. 3 and 7, an upper end of fluid hole 74 is disposed at the top surface of fluid duct block 65, and is plugged. A front open end portion of fluid pipe 67 is fitted into fluid block 65 and is joined to a vertically intermediate portion of fluid hole 78. Fluid hole 78 is fluidly connected at a lower end thereof to fluid chamber 32b via a front end portion of hydraulic cylinder 32 fitted into fluid duct block 65. In this way, fluid holes 76 and 77 formed in valve block 64, fluid pipe 67 interposed between valve block 64 and fluid duct block 65, and fluid hole 78 formed in fluid duct block 75 serve as hydraulic fluid passage 44 that fluidly connects valve port 36d of proportional pressure control valve 36 to fluid chamber 32b of hydraulic cylinder 32 as shown in the hydraulic circuit diagram of FIG. 13.

Neutral returning unit 80 will be described in detail with reference to FIGS. 1, 12 and 13. Neutral returning unit 80 includes cylinder member 81, rod 82, a neutral biasing spring 83, spring retainers 84, a bracket 85, a pivot shaft 86, retaining rings 87, and a nut 88. As mentioned above, cylindrical member 81 is extended along outer side surface 11c of vehicle frame casing 11. Cylindrical member 81 is pivoted at a fore-and-aft middle portion thereof on vehicle frame casing 11 via pivot shaft 86, so that cylindrical member 81 can be vertically oscillated at front and rear ends thereof centered on pivot shaft 86 at the fore-and-aft intermediate portion thereof.

Referring to FIG. 1, bracket 85 surrounds the fore-and-aft intermediate portion of cylindrical member 81 pivoted on pivot shaft 86. Bracket 85 is formed at upper and lower end portions thereof with respective tabs 85a having respective bolt holes 85b. Bolts (not shown) are passed through respective bolt holes 85b so as to fasten upper and lower tabs 85a of bracket 85 to outer side surface 11c of vehicle frame casing 11, thereby fixing bracket 85 to vehicle body frame 11. Bracket 85 is spaced from upper and lower end portions of cylindrical member 81 so as to allow cylindrical member 81 to oscillate centered on pivot shaft 86. Conversely, the space between bracket 85 and cylindrical member 81 defines an oscillation range of cylindrical member 81.

Cylindrical member 81 is open at front and rear ends thereof. Rod 82 is fore-and-aft extended through cylindrical member 81. A rear end portion 82b of rod 82 is extended rearward from the rear end of cylindrical member 81 and is pivotally connected to the tip of first arm 7, as mentioned above. Rod 82 is axially (fore-and-aft) slidable so that a front end portion 82c of rod 82 is able to project forward from the front end of cylindrical member 81 when rod 82 slides forward.

In cylindrical member 81, front and rear spring retainers 84 are fitted on rod 82 so as to be axially slidable relative to rod 82. Neutral biasing spring 83 is interposed between front and rear spring retainers 84 and is coiled to surround rod 82. Front and rear retaining rings 87 are fixed on front and rear inner peripheral portions of cylindrical member 81. Front retaining ring 87 restricts a forward slide of front spring retainer 84. Rear retaining ring 87 restricts a rearward slide of rear spring retainer 84.

Figure 12:
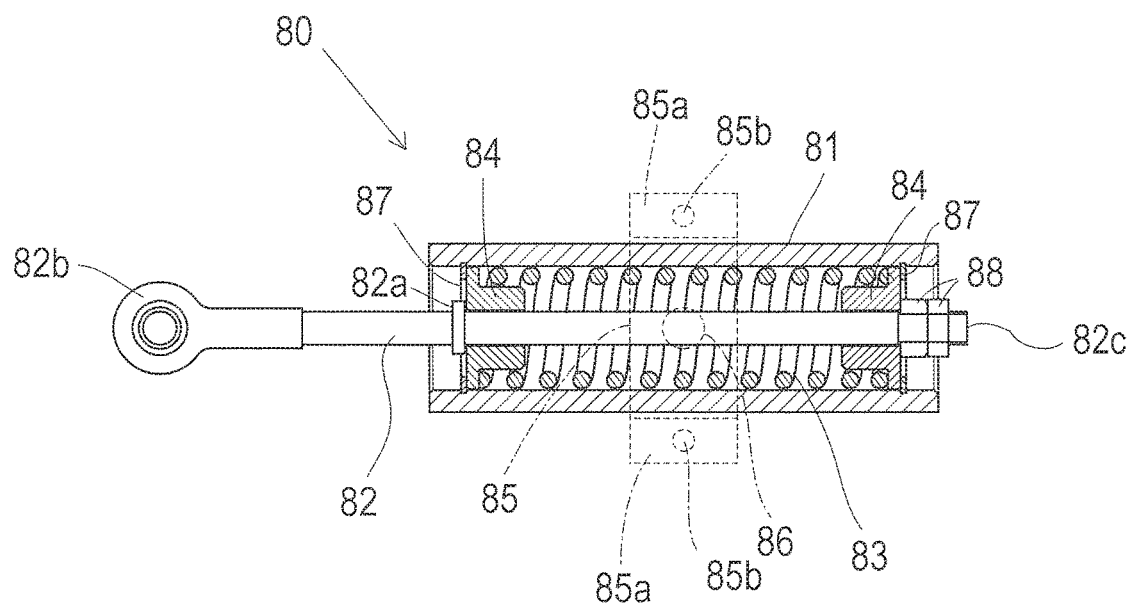
FIG. 12 is a sectional side view of a neutral returning unit 80.

FIG. 12 illustrates neutral returning unit 80 having neutral biasing spring 83 compressed in its initial state. In this state, due to the fore-and-aft expansion force of neutral biasing spring 83, both front and rear spring retainers 84 are pressed against respective retaining rings 87. A flange 82 is formed on an axially intermediate portion of rod 82 so that flange 82a contacts rear spring retainer 84 contacting rear retaining ring 87. Nut 88 is screwed on rod 82 close to front end portion 82c so that nut 88 contacts a front end of front spring retainer 84 contacting front retaining ring 87.

A position of rod 82 in its sliding direction where neutral biasing spring 83 is in the initial state as shown in FIG. 12 is defined as a neutral position of rod 82 serving as the telescopic member. The configuration to connect rod 82 to movable swash plate 6 via first arm 7 is designed so that movable swash plate 6 is set at its neutral position when rod 82 is disposed at the neutral position of rod 82. On the other hand, a position of piston 33 realized by the condition of hydraulic fluid in fluid chambers 32a and 32b in hydraulic cylinder 32 when both proportional solenoids 35a and 35b of proportional pressure control valves 35 and 36 are unexcited is defines as a neutral position of piston 33. The configuration to connect rod 82 to piston rod 33a via first arm 7, link 8 and second arm 9 is designed so that piston 33 is set at its neutral position when rod 82 is disposed at the neutral position of rod 82.

When piston 33 with piston rods 33a and 33b slides forward from its neutral position, this telescopic movement of piston 33 is transmitted to movable swash plate 6 via second arm 9, link 8 and first arm 7 so as to tilt movable swash plate 6 in one direction for either forward or backward traveling of the vehicle. At this time, the lower end portion of first arm 7 rotates rearward so that rod 82 slides rearward. Cylindrical member 81 oscillates centered on pivot shaft 86 so as to absorb the differential movement between the circular movement of first arm 7 serving as the rotary member and the linear movement of rod 82 serving as the telescopic member. According to the rearward slide of rod 82, nut 88 fixed on rod 82 pushes front spring retainer 84 rearward while rear spring retainer 84 is kept to contact rear retaining ring 87. Therefore, neutral biasing spring 83 is compressed further from the initial compression state so as to apply a forward biasing force to rod 82, thereby biasing rod 82, movable swash plate 6 and piston 33 toward the respective neutral positions.

On the other hand, when piston 33 with piston rods 33a and 33b slides rearward from its neutral position, movable swash plate 6 is tilted in the other direction for either forward or backward traveling of the vehicle. At this time, the lower end portion of first arm 7 rotates forward so that rod 82 slides forward. Cylindrical member 81 oscillates centered on pivot shaft 86 so as to absorb the differential movement between the rotation first arm 7 and the linear movement of rod 82. According to the forward slide of rod 82, flange 82c on rod 82 pushes rear spring retainer 84 forward while front spring retainer 84 is kept to contact front retaining ring 87. Therefore, neutral biasing spring 83 is compressed further from the initial compression state so as to apply a rearward biasing force to rod 82, thereby biasing rod 82, movable swash plate 6 and piston 33 toward the respective neutral positions.

As mentioned above, the neutral position of rod 82 defines the neutral positions of first arm 7 and movable swash plate 6, and defines the neutral position of piston 33 (while both proportional solenoids 35a and 36a of proportional pressure control valves 35 and 36 are unexcited) via first arm 7, link 8 and second arm 9. In other words, when rod 82 of neutral returning unit 80 is returned to its neutral position by the biasing force of spring 83, piston 33 of servo unit 60 also returns to its neutral position.

Referring to FIG. 6, in the fore-and-aft direction, the neutral position of piston 33 also substantially coincides to the position of pivot shaft 62 oscillatively supporting hydraulic cylinder 32, thereby balancing the action of piston 33 in hydraulic cylinder 32, and thereby reducing the oscillation of cylinder 32 according to the telescopic movement of piston rod 33a.

A second embodiment about a hydraulic servo unit serving as an actuator device for controlling a movable swash plate of an HST will now be described with reference to FIGS. 14 to 24. Description of the members and portions designated by the reference numerals used for description of the first embodiment is omitted because they are identical or similar to the respective members and portions of the first embodiment designated by the same reference numerals.

An object of this embodiment is to provide an actuator unit that can easily be connected to a movable swash plate of the HST, which needs no link for its connection to an arm on a tip of a trunnion shaft of the movable swash plate, and which needs no work for fixing an arm to the trunnion shaft or for attaching or connecting a hydraulic cylinder or a piston rod serving as the actuator to a part of a vehicle body, such as the above-mentioned vehicle frame casing, thereby improving the HST with the actuator unit in assembly and maintenanceability.

Figure 14:
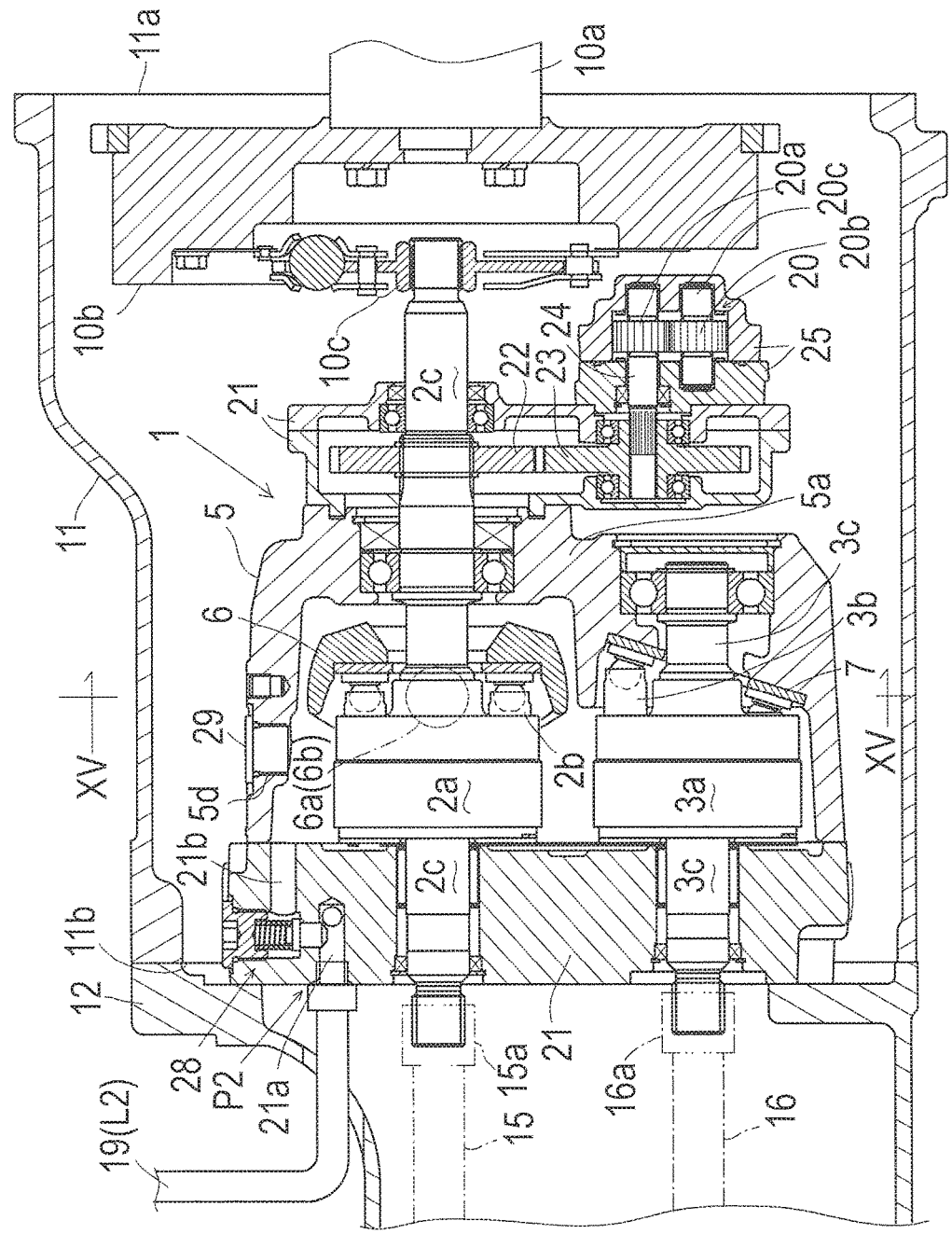
FIG. 14 is a sectional side view of HST 1 disposed in vehicle frame casing 11 to be provided with a servo unit 30 according to a second embodiment.
Figure 15:
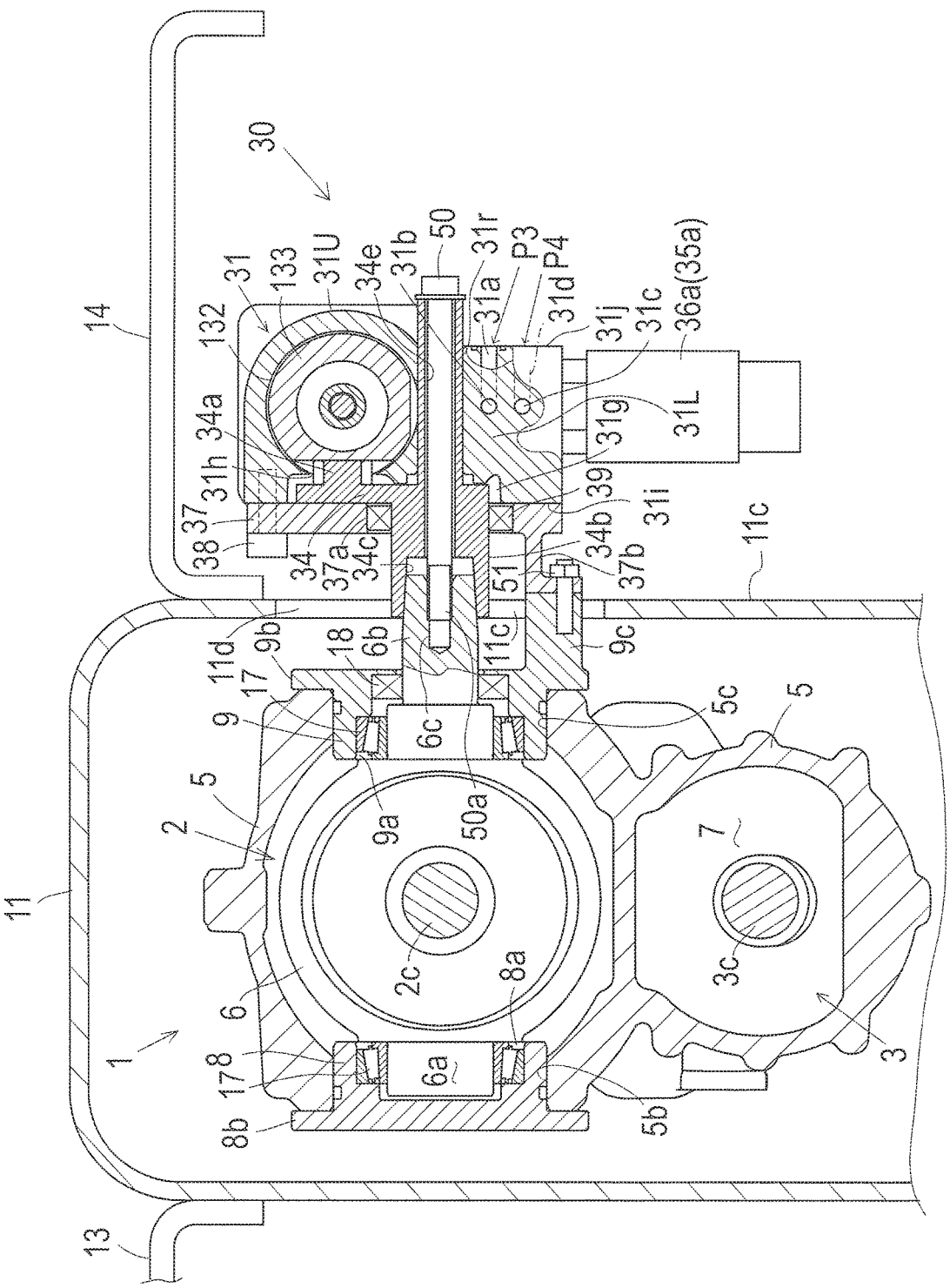
FIG. 15 is a cross sectional view taken along XV-XV line of FIG. 14 as a sectional rear view of HST 1 provided with servo unit 30 according to the second embodiment.

Referring to FIGS. 14 and 15, HST 1, vehicle frame casing 11 and axle casing 12 are configured similar to those of the first embodiment described with reference to FIGS. 1 and 2. The configurations of HST 1, vehicle frame casing 11 and axle casing 12, which have been omitted from the description of those of the first embodiment, or which are different from those of the first embodiment, will be described in detail. Referring to FIG. 15, right and left coaxial through holes 5b and 5c are formed in right and left side walls of HST housing 5 so as to communicate the inside space of HST housing 5 with the outside space of HST housing 5. A bearing cap 8 is fitted into hole 5b. A bearing bracket 9 is fitted into hole 5c. Bearing cap 8 is formed at an outer end portion thereof with a flange 8b. Flange 8b is fitted onto one of the right and left outer side surfaces of HST housing 5 so as to cover an outer open end of hole 5b. Similarly, bearing bracket 9 is formed with a flange 9b fitted onto the other of the right and left outer side surfaces of HST housing 5 so as to cover an outer open end of hole 5c.

In this embodiment, right and left trunnion shafts of movable swash plate 6 are defined as a short trunnion shaft 6a and long trunnion shaft 6b. Bearing cap 8 and bearing bracket 9 are formed therein with respective bearing holes 8a and 9a. Bearings 17 are provided in respective bearing holes 8a and 9a so as to fit respective inner peripheral surfaces of bearing cap 8 and bearing bracket 9. A fluid seal 18 is fitted in bearing hole 9a of bearing bracket 9. Trunnion shaft 6a is inserted into bearing hole 8a, and trunnion shaft 6b into bearing hole 9a, so that trunnion shafts 6a and 6b are journalled by bearing cap 8 and bearing bracket 9 via respective bearings 17. Therefore, flange 8b of bearing cap 8 covers a tip of short trunnion shaft 6a so that the tip of trunnion shaft 6a does not project outward from HST housing 5. On the other hand, lateral bearing hole 9a penetrates bearing bracket 9 so that an outer end of bearing hole 9a is open at flange 9b of bearing bracket 9. Therefore, a tip portion of long trunnion shaft 6b projects outward from flange 9b of bearing bracket 9, i.e., the outer end of bearing hole 9a, thereby projecting outward from HST housing 5. Fluid seal 18 prevents lubricating fluid from leaking from bearing 17 in bearing bracket 9 to the outside of HST housing 5. Further, a right or left side wall (in this embodiment, a right side wall) of vehicle body frame 11 having outer side surface 11c (referred to in the first embodiment) is formed therethrough with a hole 11d, and the tip portion of trunnion shaft 6b projects outward from outer side surface 11c of vehicle frame casing 11 via hole 11d.

Bearing bracket 9 is formed with a foot portion 9c projecting laterally outward from flange 9b. Foot portion 9c may be extended along an outer peripheral edge when viewed in the axial direction of trunnion shaft 6b. Alternatively, a plurality of foot portions 9c may be aligned along the outer peripheral edge of flange 9b. Foot portion 9c projects outward from outer side surface 11c of vehicle frame casing 11 via hole 11d. In this way, the tip portion of trunnion shaft 6b and foot portion 9c of bearing bracket 9 are extended via hole 11d into the space below step 14 outside of vehicle frame casing 11. In this embodiment, a servo unit 30, instead of servo unit 40 of the first embodiment, is disposed below step 14 and is attached to vehicle frame casing 11 by use of the tip portion of trunnion shaft 6b and foot portion 9c of bearing bracket 9 projecting outward from vehicle frame casing 11.

Due to the joint of engine 10 to front open end 11a of vehicle frame casing 11, fore-and-aft horizontal engine output shaft 10a provided with flywheel 10b at a rear end portion thereof is extended rearward into vehicle frame casing 11 via front open end 11a. Pump shaft 2c serving as the input shaft of HST 1 is extended further forward from gear housing 21 and is connected to flywheel 10b via a damper 10c. Similar to the first embodiment, pump shaft 2c is drivingly connected via gears 22 and 23 in gear casing 21 to charge pump 20 in pump housing 25 extended forward from gear casing 21.

Referring to 17, the HST hydraulic fluid supply system for supplying HST 1 with hydraulic fluid delivered from charge pump 20 is configured similar to that of the first embodiment as shown in FIG. 13. Moreover, in the second embodiment, referring to FIG. 14, a fluid pipe 72 serves as fluid passage L2 for supplying fluid delivered from charge pump 20 to port P2. Fluid pipe 72 is extended from the outside of axle casing 12 into the inside of axle casing 12 through a hole 12a bored in a wall of axle casing 12 so as to be joined to the rear open end of charge fluid passage 4a at the rear end surface of center section 4. Alternatively, fluid passage L2 in the second embodiment may be configured in another way. In this regard, charge fluid passage 4a in center section 4 may not be open to the inside of axle casing 12 as shown in FIG. 14.

Figure 16:
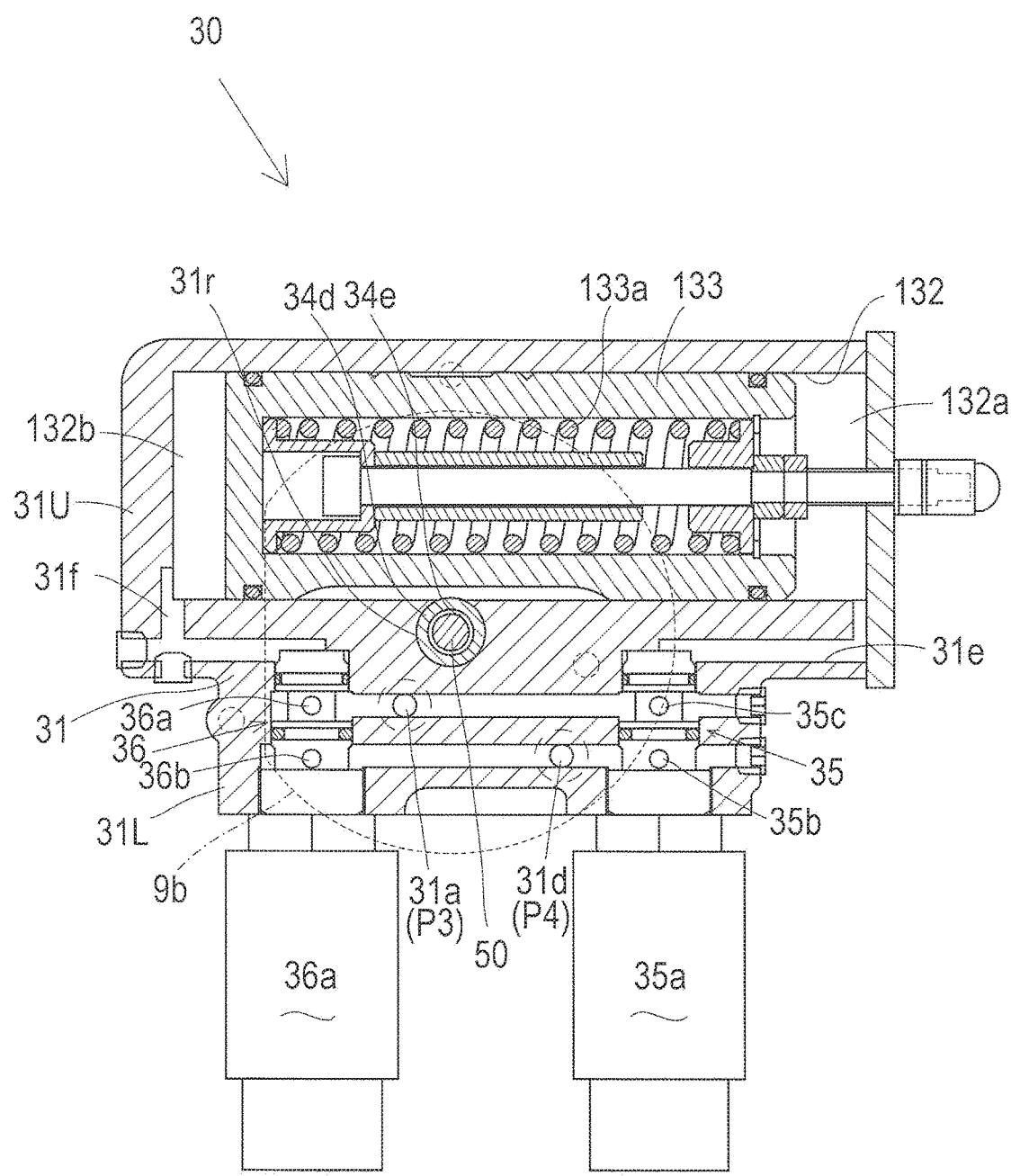
FIG. 16 is a sectional side view of a portion of servo unit 30 including a hydraulic cylinder 32.
Figure 17:
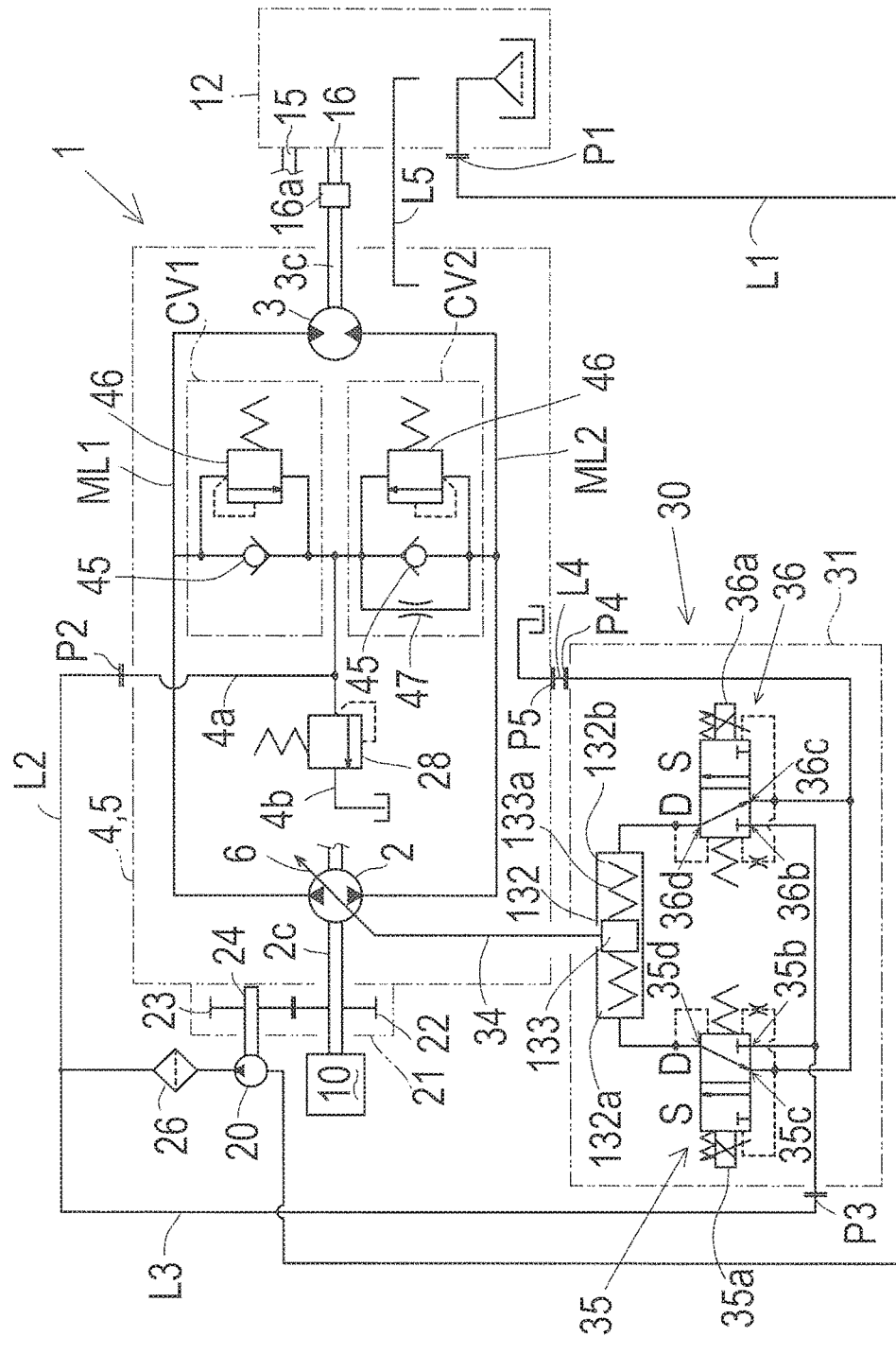
FIG. 17 is a hydraulic circuit diagram for supplying fluid to HST 1 and servo unit 30.

Referring to FIG. 17, a general configuration of servo unit 30 and a hydraulic fluid supply system for supplying servo unit 30 with hydraulic fluid delivered from charge pump 20 will be described. Servo unit 30 includes a servo housing 31 formed therein with a hydraulic cylinder 132, similar to hydraulic cylinder 32 of servo unit 60 in the first embodiment. Piston 133 and a spring 133a for biasing piston 133 toward a neutral position of piston 133 are disposed in hydraulic cylinder 132 formed in servo housing 31. Piston 133 divides the inside space of servo housing 31 serving as hydraulic cylinder 132 into front and rear fluid chambers 132*a* and 132*b*. In this regard, FIG. 17 (and later-discussed FIG. 24) illustrates spring 133*a* as being different in structure from spring 133*a* shown in FIG. 16. However, the only purpose of illustration of spring 133*a* in the hydraulic circuit diagram of FIG. 17 (and FIG. 24) is to indicate the function of spring 133*a* to bias piston 133 toward the neutral position. Therefore, spring 133*a* may have any configuration, such as shown in FIG. 16, only if spring 133*a* has the required function.

Referring to FIGS. 15 and 16, a concrete configuration of servo unit 30 will be described while it is generally configured as mentioned above with reference to FIG. 17. Servo unit 30 is disposed just under step 14 as mentioned above, so that step 14 is disposed immediately above a top surface of servo unit 30. Therefore, proportional pressure control valves 35 and 36 are juxtaposed front and rear, and are disposed in a lower portion 31L of servo housing 31 (hereinafter referred to as "lower housing portion 31L"). Solenoids 35*a* and 36*a* of respective proportional pressure control valves 35 and 36 project downward from a bottom surface of servo housing 31. On the other hand, fore-and-aft horizontal hydraulic cylinder 132 is formed in upper portion 31U (hereinafter referred to as "upper housing portion 31U").

Proportional pressure control valves 35 and 36 provided in lower housing portion 31L are provided at upper portions thereof with respective suction ports 35*b* and 36*b*, and at lower portions thereof with respective drain ports 35*c* and 36*c*. A fore-and-aft horizontal suction fluid hole 31*b* is formed in lower housing portion 31L so as to fluidly connect suction ports 35*b* and 36*b* to each other via suction fluid hole 31*b*. A laterally horizontal suction fluid hole 31*a* is formed in lower housing portion 31L so as to extend from a fore-and-aft intermediate portion of suction fluid hole 31*b* in the direction laterally opposite outer side surface 11*c* of vehicle body frame 11 and HST 1. Hereinafter, in the description of servo unit 30 and later-discussed servo units 30A, 30B, 30C, 30D and 30E as modifications of servo unit 30, this side laterally opposite vehicle frame casing 11 and HST 1 is defined as a "distal" side, while another side toward vehicle frame casing 11 and HST 1 is defined as a "proximal" side. Suction hole 31*a* has an outer end open at a right or left "distal" side surface 31*j* of servo housing 31 (hereinafter referred to as "distal housing side surface 31*j*"). This open end of suction fluid hole 31*a* serves as inlet port P3 shown in FIG. 17 so as to be joined to a fluid pipe or the like serving as fluid passage L3.

A fore-and-aft horizontal drain fluid hole 31*c* is formed in lower housing portion 31L below suction fluid hole 31*b* so as to fluidly connect drain ports 35*c* and 36*c* to each other via drain fluid hole 31*d*. A laterally horizontal drain fluid hole 31*d* is formed in lower housing portion 31L so as to extend distally from a fore-and-aft intermediate portion of drain fluid hole 31*c*. Drain fluid hole 31*d* has an outer end open at distal housing side surface 31*j*. This open end of drain fluid hole 31*d* serves as outlet port P4 shown in FIG. 17 so as to be joined to a fluid pipe or the like serving as fluid passage L4.

Servo housing 31 has a right or left (in this embodiment, left) proximal side surface 31*i* (hereinafter referred to as "proximal housing side surface 31*i*") facing vehicle frame casing 11 and HST 1. Proximal housing side surface 31*i* is formed with a notch 31*g* (see FIG. 15) over upper and lower housing portions 31U and 31L. An arm 34 is disposed in notch 31*g* so as to serve as a connection member for connecting piston 133 to trunnion shaft 6*b* of movable swash plate 6 of HST 1. Further, a hole 31*h* is formed in upper housing portion 31U so as to connect an upper portion of notch 31*g* in upper housing portion 31U to hydraulic cylinder 132. An engagement portion 34*a* projects from a top portion of arm 34 disposed in the upper portion of notch 31*g* so as to engage with piston 133 in hydraulic cylinder 132 via hole 31*h*. In this regard, hole 31*h* is fluidly connected to neither fluid chamber 132*a* nor 132*b* regardless of the slide direction or degree of piston 133. In other words, piston 133 keeps the fluidal tightness of fluid chambers 132*a* and 132*b* from notch 31*g*.

In a lower portion of notch 31*g*, arm 34 is formed at a lower portion thereof with an trunnion boss 34*b* and a bolt boss 34*d* joined coaxially to each other. A later-discussed cover member 37 journals trunnion boss 34*b* via a bearing, i.e., a later-discussed fluid seal 39. Trunnion boss 34*b* project proximally horizontally from cover member 37. A tapered recess 34*c* is formed in an end portion of trunnion boss 34*b* projecting proximally from cover member 37. A tapered tip portion of trunnion shaft 6*b* is inserted into recess 34*c*.

Distally horizontal bolt boss 34*d* is extended laterally opposite trunnion boss 34*b*. A hole 31*r* is bored through a boundary portion of servo housing 31 between upper and lower housing portions 31U and 31L (i.e., below hydraulic cylinder 132 and above proportional pressure control valves 35 and 36) so as to extend from notch 31*g* on the proximal side of servo housing 31 to the distal end of the boundary portion of servo housing 31. Bolt boss 34*d* is passed through hole 31*r* rotatably relative to servo housing 31 so as to project at an outer end thereof distally outward from distal housing side surface 31*j*. Bolt boss 34*d* and trunnion boss 34*b* are bored through by an axial bolt hole 34*e* from the distal outer end of bolt boss 34*d* to recess 34*c* in trunnion boss 34*b*.

A cover member 37 is fixed to proximal housing side surface 31*i* of servo housing 31 so as to cover notch 31*g*. More specifically, cover member 37 is fastened to servo housing 31 by at least one bolt 38. A hole 37*a* is provided in cover member 37. Trunnion boss 34*b* of arm 34 is passed through hole 37*a*. A fluid seal 39 is provided in hole 37*a* so as to keep the fluidal tightness of trunnion boss 34*b* from cover member 37. Bot boss 34*d* is extended on the rotary axis of trunnion boss 34*b*, and is passed through servo housing 31. In this way, arm 34 is journalled at the lower portion thereof formed with laterally extended trunnion boss 34*b* and bolt boss 34*d* by cover member 37 and servo housing 31. Cover member 37 is formed with a foot portion 37*b* extended proximally therefrom so as to correspond to foot portion 9*c* of bearing bracket 9.

Servo unit 30 is a unit including arm 34 and cover member 37. The tip portion of trunnion shaft 6*b* projecting outward from vehicle frame casing 11 via hole 11*d* and foot portion 9*b* of bearing bracket 9, as mentioned above, are utilized to attach servo unit 30 to HST 1. In the series of works for attaching servo unit 30 to HST 1, first, the tapered tip portion of trunnion shaft 6*b* is fitted into tapered recess 34*c* formed on trunnion boss 34*b* of arm 34 projecting outward from cover member 37. The taper shapes of recess 34*c* and the tip portion of trunnion shaft 6*b* become narrower as they go in the distal direction. Therefore, after the tip portion of trunnion shaft 6*b* enters a little into recess 34*c*, entire servo unit 30 is further pressed proximally. Finally, the tapered tip portion of trunnion shaft 6*b* is completely fitted into tapered recess 34*c*, and servo unit 30 comes to be able to be pressed no further proximally. Then, a bolt 50 is inserted into bolt hole 34*e* from the distal open end of bolt boss 34*d* of arm 34 projecting distally from servo housing 31. In this regard, a tapped hole 6*c* is axially formed in trunnion shaft 6b and is open at the tip end surface of trunnion shaft 6b, and a threaded portion 50a of bolt 50 projecting proximally from bolt hole 34e into recess 34c is screwed into tapped hole 6c, thereby fixing arm 34 to trunnion shaft 6b.

Further, a proximal side surface of foot portion 37b of cover member 37 contacts a distal side surface of foot portion 9c of bearing bracket 9 projecting from vehicle frame casing 11 via hole 11d. Foot portion 37b is fastened to foot portion 9c via at least one bolt 51. In this way, cover member 37 is fixed to bearing bracket 9 so that servo housing 31 outside of vehicle frame casing 11 is fixed to HST housing 5 inside of vehicle frame casing 11, thereby completing the attachment of servo unit 30 to HST 1.

Referring to FIG. 15, step 14 disposed above servo unit 30 is a substantially horizontal plate that does not cover servo unit 30 at the distal side of servo unit 30. In other words, servo unit 30 is open at the distal portion thereof, so that an operator can easily handle servo unit 30 to bring servo unit 30 to the attachment position below step 14, and then, the operator can easily perform the above-mentioned series of works for attaching servo unit 30 to HST 1, i.e., the location of servo unit 30 relative to trunnion shaft 6b by inserting the tip portion of trunnion shaft 6b into recess 34c, the proximal pressing of servo unit 30 for engaging arm 34 to trunnion shaft 6b, and the screwing of bolts 50 and 51. On the other hand, when servo unit 30 has to be detached from HST 1 for the purpose of maintenance or the like, an operator also benefits facility in the series works, i.e., the access to servo unit 30 below step 14, the releasing of bolts 50 and 51, and the distal withdrawing of servo unit 30. Therefore, servo unit 30 needs neither its own disassembling nor its own reassembling to be attached or detached to and from HST 1.

After the attachment of servo unit 30 to HST 1 is completed, proportional pressure control valves 35 and 36 are controlled to slide piston 133 in hydraulic cylinder 132 in the fore-and-aft direction. As piston 133 slides, engagement portion 34a of arm 34 rotates in the fore-and-aft direction centered on the axis of bolt 50. Accordingly, trunnion boss 34b and bolt boss 34d of arm 34 also rotate centered on the axis of bolt 50. Therefore, trunnion shaft 6b fixed to arm 34 via bolt 50 rotates integrally with trunnion boss 34b centered on the axis of bolt 50, thereby tilting movable swash plate 6.

In this regard, the upper portion of arm 34 including engagement portion 34a moves vertically while it rotates in the fore-and-aft direction following the fore-and-aft movement of piston 133 along its fore-and-aft horizontal axis. Notch 31g and hole 31h are formed so as to allow this vertical movement of the upper portion of arm 34. Further, due to the rotatability of bolt boss 34d in through hole 31r of servo housing 31 relative to servo housing 31, the rotatability of arm 34 including bolt boss 34d centered on the axis of bolt 50 is ensured.

Referring to FIGS. 18 to 23, servo units 30A, 30B, 30C, 30D and 30E serving as modifications of servo unit 30 according to the second embodiment will be described. However, description of the component elements designated by the same reference numerals as those used for description of the embodiment shown in FIGS. 14 to 17 will be omitted except for some special cases, on the assumption that they are identical or similar to those designated by the same reference numerals in the embodiment of FIGS. 14 to 17.

Servo unit 30A will be described with reference to FIG. 18. Servo unit 30A has a servo housing 31A that is similar to servo housing 31 of servo unit 30 except that a lower portion of notch 31g formed in servo housing 31A is expanded further downward so as to serve as a gallery 31m, and drain fluid hole 31d extended distally from drain fluid hole 31c is not formed but a drain fluid hole 31k is formed in servo housing 31A so as to extend proximally from drain fluid hole 31c and so as to be open at proximal housing side surface 31i to gallery 31m.

Servo unit 30A also includes a cover member 37A that is similar to cover member 37 of servo unit 30 except that cover member 37A is not formed with foot portion 37b but is formed with a circular mount boss 37c surrounding the entire outer peripheral surface of trunnion boss 34b of arm 34. Correspondingly, HST 1 is provided with a bearing bracket 9A that is similar to bearing bracket 9 except that bearing bracket 9A is not formed with foot portion 9c but is formed with a circular mount boss 9d surrounding the entire outer peripheral surface of trunnion shaft 6b and projecting distally from flange 9b. Mount boss 37c and mount boss 9d are joined to each other (i.e., fastened to each other by bolt 51) so as to form a gallery 52 that is a closed circular space surrounding trunnion shaft 6b and trunnion boss 34b.

Cover member 37A of servo unit 30A is formed so as to have a gap 37b between cover member 37A and trunnion boss 34b. Gap 37d fluidly connects gallery 31m in servo housing 31A to gallery 42 in mount bosses 9d and 37c. Bearing bracket 9A adapted to have servo unit 30A has no fluid seal like fluid seal 18 in the outer side portion of bearing hole 9a therein.

Figure 18:
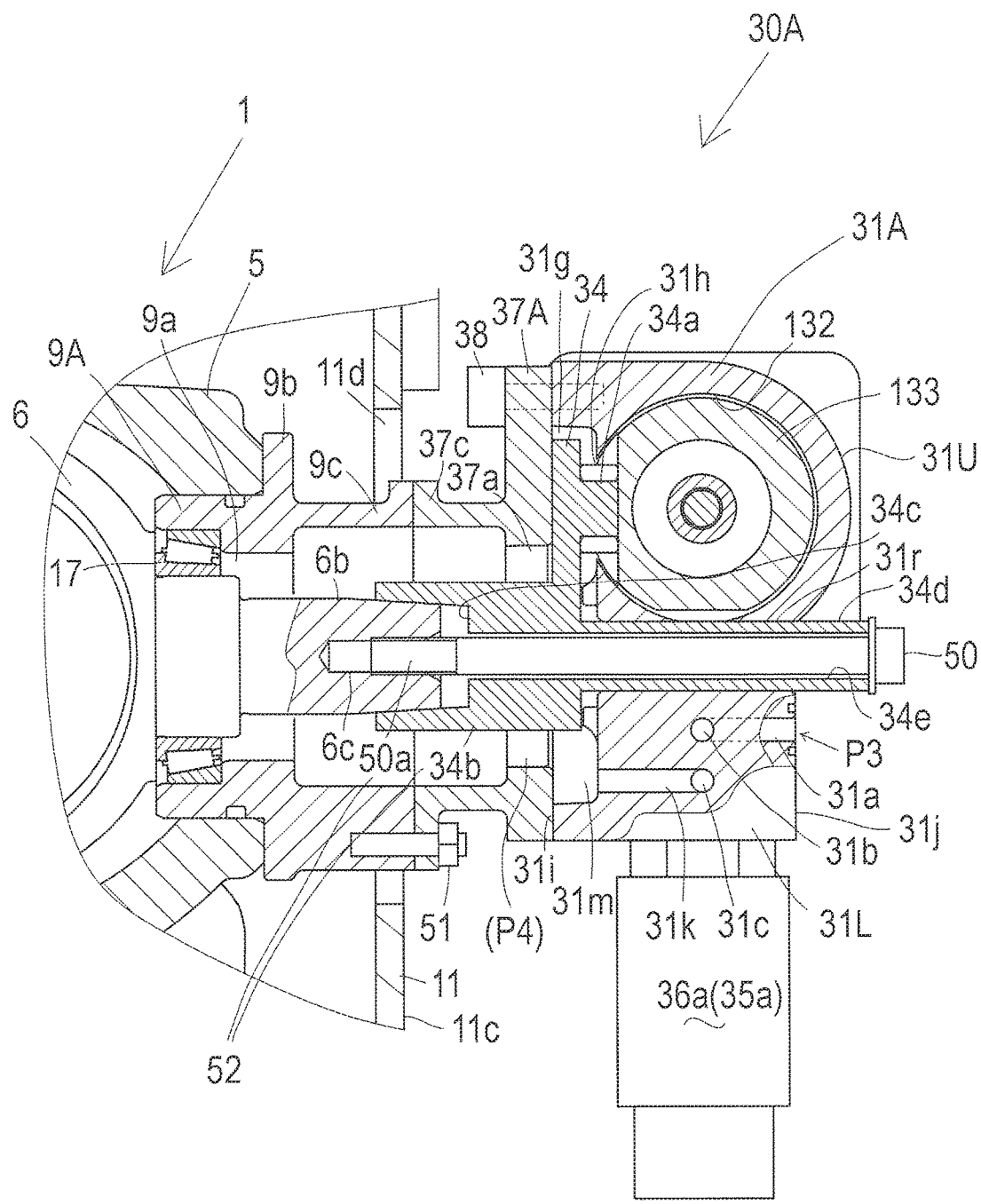
FIG. 18 is a sectional rear view of a servo unit 30A.

Due to the above-mentioned structure, servo unit 30A can drain fluid from drain fluid hole 31k in servo housing 31A to gallery 31m in a direction designated by an arrow in FIG. 18. The drained fluid in gallery 31m enters gallery 52 via gap 37d, and is supplied from gallery 52 to bearing 17 on trunnion shaft 6b as lubricating fluid for bearing 17 and trunnion shaft 6b. The fluid is further introduced into HST housing 5 so as to lubricate the various parts of HST 1 in HST housing 5. Referring to the hydraulic circuit diagram of FIG. 17, gap 37d serves as outlet port P4, notch 9e serves as inlet port P5, and gallery 52 serves as fluid passage L4.

Figure 19:
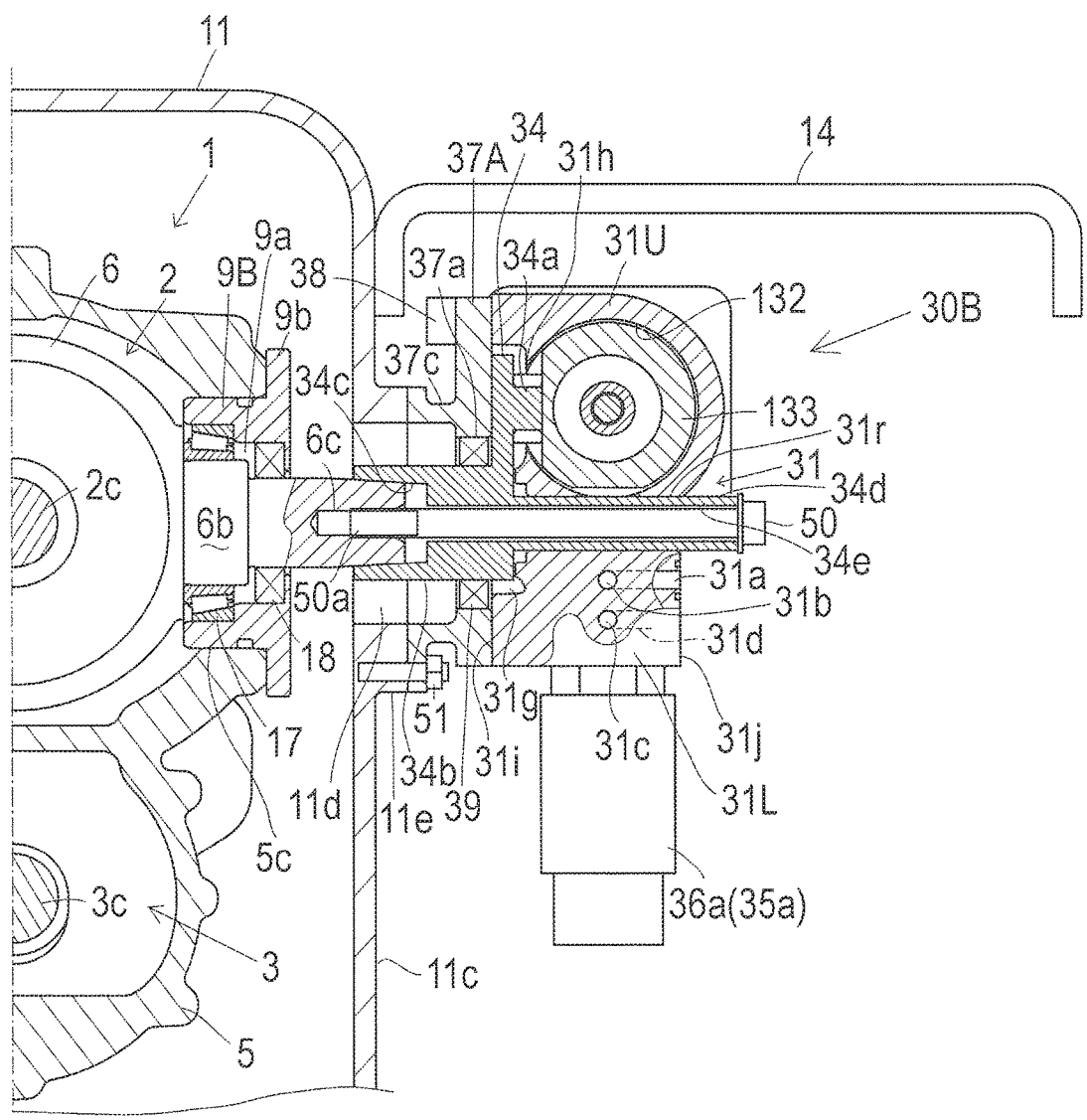
FIG. 19 is a sectional rear view of a servo unit 30B.

Servo unit 30B will be described with reference to FIG. 19. Similar to servo units 30 and 30A, servo unit 30B is fixed to trunnion shaft 6b of movable swash plate 6 of HST 1 via hole 11d of vehicle frame casing 11. However, servo housing 31 of servo unit 30B is not fixed to bearing bracket 9 but is fixed to vehicle frame housing 11, in comparison with each of servo housings 31 and 31A of servo units 30 and 30A that is fixed to bearing bracket 9 of HST 1.

Servo unit 30B employs cover member 37A including circularly cylindrical mount boss 37c, similar to servo unit 30A. Vehicle frame casing 11 is formed with a mount portion 1e around hole 11d. The proximal end surface of mount boss 37c contacts an end surface of mount portion 11e, and is fastened to mount portion 11e by bolt 51, thereby fixing cover member 37A to vehicle frame casing 11, and thereby fixing servo housing 31 to vehicle fame casing 11.

In correspondence to servo unit 30B, HST 1 is provided with a bearing bracket 9B for journaling trunnion shaft 6b. Since bearing bracket 9B does not need to have a portion like foot portion 9c or mount boss 9d for its joint to cover member 37 or 37A, bearing bracket 9B is formed at an outer end portion with a flange 9b, similar to bearing cap 8. Therefore, while bearing bracket 9B does not project distally outward from vehicle frame casing 11, trunnion shaft 6b projects outward from flange 9b of bearing bracket 9B and further projects outward from vehicle frame casing 11 via hole 11d. In this way, bearing bracket 9B is simplified in shape so as to reduce costs for its production.

Since cover member 37A of servo unit 30B is not joined to bearing bracket 9B, bearing 17 in bearing bracket 9B cannot be supplied with lubricating fluid from servo unit 30B via the fluid passage formed in cover member 37A and bearing bracket 9B joined to each other. This is because servo unit 30B employs servo housing 30 identical to servo housing 30 of servo unit 30. In this regard, servo housing 31 is formed with drain fluid hole 31$d$ open at distal housing side surface 31$j$, and with gallery 31$g$ instead of downwardly expanded gallery 31$m$. Further, cover member 37A of servo unit 30B is provided with no gap like gap 37$d$ around fluid seal 39, thereby ensuring its fluidal tightness.

Figure 20:
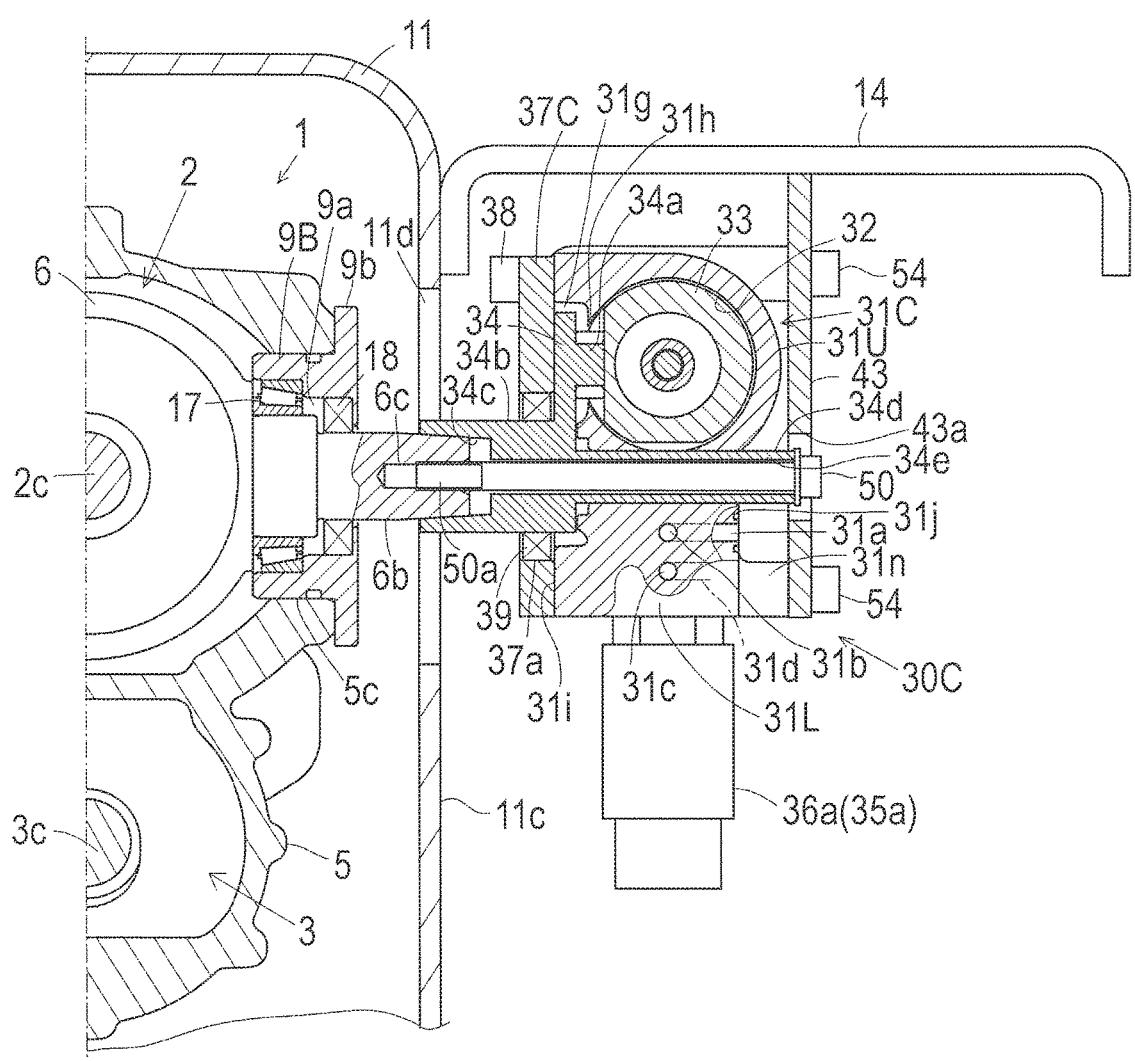
FIG. 20 is a sectional rear view of a servo unit 30C.

Servo unit 30C will be described with reference to FIG. 20. Servo unit 30C includes arm 34 fixed to trunnion shaft 6$b$ in the above-mentioned way. On the other hand, servo unit 30C includes a servo housing 31C fixed to step 14. In this regard, a cover plate 53 is extended vertically downward from step 14 at the distal side of servo unit 30C. Servo housing 31C is formed with a bolt boss 31$n$ that is extended distally so as to contact cover plate 53 at a distal side surface thereof. A bolt 54 is screwed into bolt boss 31$n$ via cover plate 53 so as to fasten servo housing 31C to cover plate 53.

Servo unit 30C includes a cover member 37C. Cover member 37 is a simple flat plate-shaped member that is not formed with a portion like foot portion 37$b$ or mount boss 37$c$. Therefore, simple bearing bracket 9B having no portion to which cover member 37 or 37A is attached is provided to journal trunnion shaft 6$b$. Such simple and economic bearing bracket 9B and cover member 37C are used to constitute HST 1 with servo unit 30C.

Cover plate 53 is provided with a hole 53$a$ through which bolt boss 34$d$ of arm 34 projects at an outer end portion thereof outward so that bolt 50 can easily be inserted or withdrawn into and from boss hole 34$e$ in bolt boss 34$d$ outside of cover plate 53.

Figure 21:
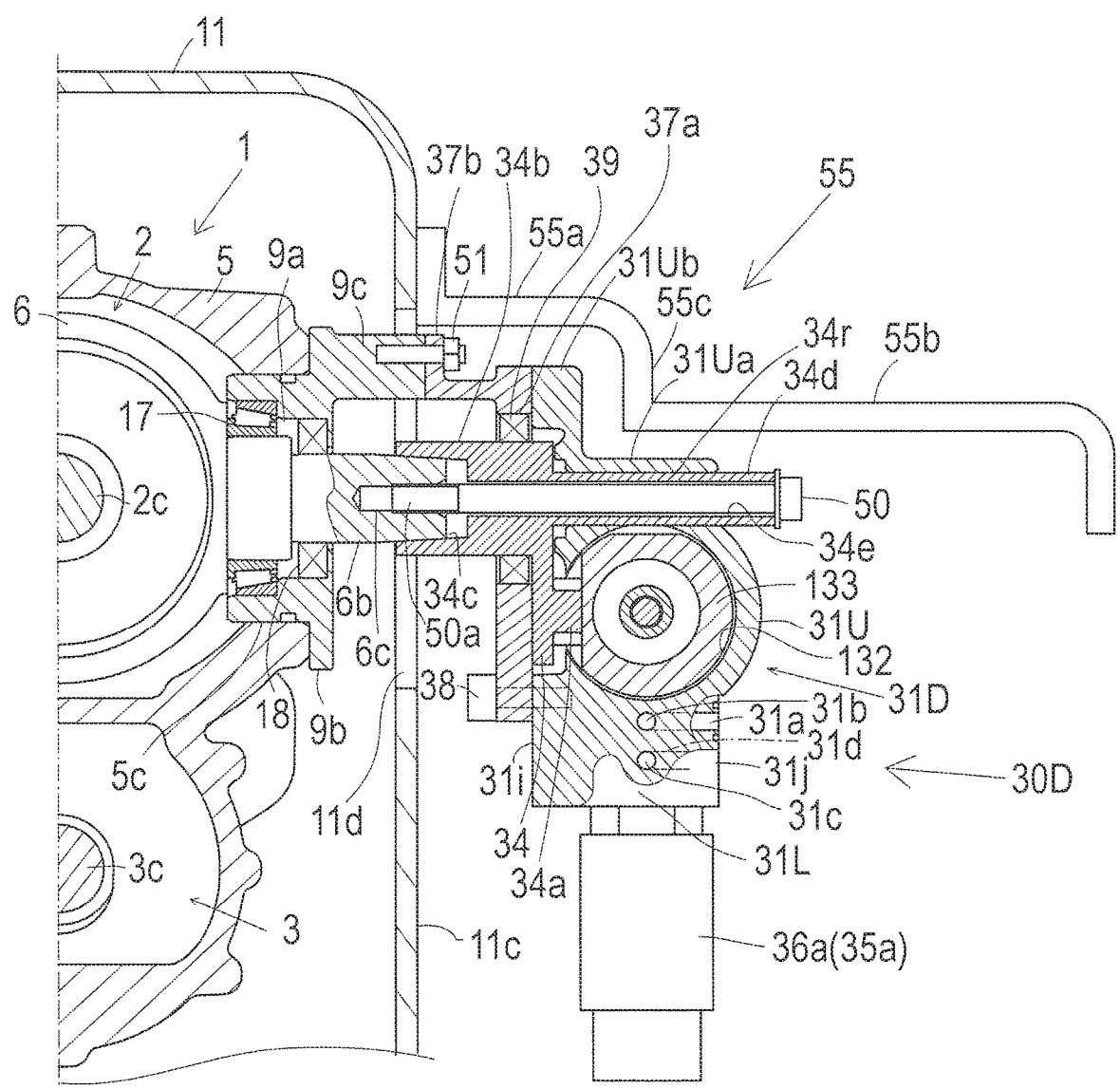
FIG. 21 is a sectional rear view of a servo unit 30D.

Servo unit 30D will be described with reference to FIG. 21. Correspondingly, a step 55, instead of step 14, is fixed to outer side surface 11$c$ of vehicle frame casing 11 at a position lower than step 14. Step 55 is stepped to have an upper step plate 55$a$, a lower step plate 55$b$, and a vertical plate portion 55$c$ between upper and lower step plates 55$a$ and 55$b$. Lower step plate 55$b$ of step 55 is lower than an upper end of hole 11$d$ in comparison with step 14 considerably higher than the upper end of hole 11$d$. If the axis of trunnion shaft 6$b$ were located between upper housing portion 31U of servo housing 31 or 31A and proportional pressure control valves 35 and 36 in lower housing portion 31L, similar to that for servo units 30, 30A, 30B and 30C, upper housing portion 31U above the axis of trunnion shaft 6$b$ would have interfered with lower step plate 55$b$ of step 55.

Therefore, servo unit 30D disposed below step 55 includes a servo housing 31D. An upper portion of upper housing portion 31U of servo housing 31D above hydraulic cylinder 132 is formed with an upward extended portion 31Ua. Upper extended portion 31Ua of servo housing 31D is formed with through hole 31$r$ through which bolt boss 34$d$ of arm 34 is passed. Further, servo housing 31D is formed with an upward extended portion 31Ub that is extended upward vertically from upward extended portion 31Ua and along proximal housing side surface 31$i$. Therefore, notch 31$g$ along proximal housing side surface 31$i$ is formed over upward extended portions 31Ua and 31Ub and upper housing portion 31U. Through hole 31$r$ is extended distally from an upper portion of notch 31$g$ so as to be disposed above hydraulic cylinder 132.

In this way, upper housing portion 31U of servo housing 31D formed with hydraulic cylinder 32 is disposed below the axis of trunnion shaft 6$b$, thereby enabling step 55 to be disposed at the position immediately above upward extended portion 31Ua of servo housing 31D passing bolt boss 33$d$ therethrough, i.e., the position of the axis of trunnion shaft 6$b$. The step-shape of step 55 corresponds to a step-shape formed by upper extended portions 31Ua and 31Ub of servo housing 31D. In this regard, vertical plate portion 55$c$ faces a distal vertical side surface of upward extended portion 31Ub, upper step 45$a$ is disposed immediately above the top of upward extended portion 31Ub, and lower step 45$b$ immediately above the top of upward extended portion 31Ua.

Arm 34 adapted to servo unit 30D is arranged so as to have trunnion boss 34$b$ and bolt boss 34$b$ at an upper portion thereof, and so as to have engagement portion 34$a$ for engagement with piston 133 at a lower portion thereof. In other words, arm 34 of servo unit 30D corresponds to upside-down reversed arm 34 of each of servo units 30, 30A, 30B and 30C. In this regard, servo unit 30D employs cover member 37 formed with foot portion 37$b$ to journal arm 34, and HST 1 employs bearing boss 9 formed with foot portion 9$c$ to be joined to foot portion 37$b$ of cover member 37. However, in correspondence to the above-mentioned reverse arrangement of arm 34, cover member 37 of servo unit 30D and bearing boss 9 used for servo unit 30D correspond to upside-down reversed cover member 37 of servo unit 30 and upside-down reversed bearing boss 9 for servo unit 30.

Alternatively, servo unit 30D may be provided with cover member 37A having mount boss 37$c$, and bearing boss 9A having mount boss 9$d$ may be provided for servo unit 30D. However, if fluid drained from proportional pressure control valves 35 and 36 has to be led from servo unit 30D to bearing 17 in bearing bracket 9A, horizontal fluid hole 31$k$ should be replaced with another appropriate fluid guide structure to guide fluid from drain fluid hole 31$c$ to notch 31$g$, because if servo housing 31D is adapted to servo unit 30D, drain fluid hole 31$c$ in fluid housing 31D becomes considerably lower than notch 31$g$.

Figure 22:
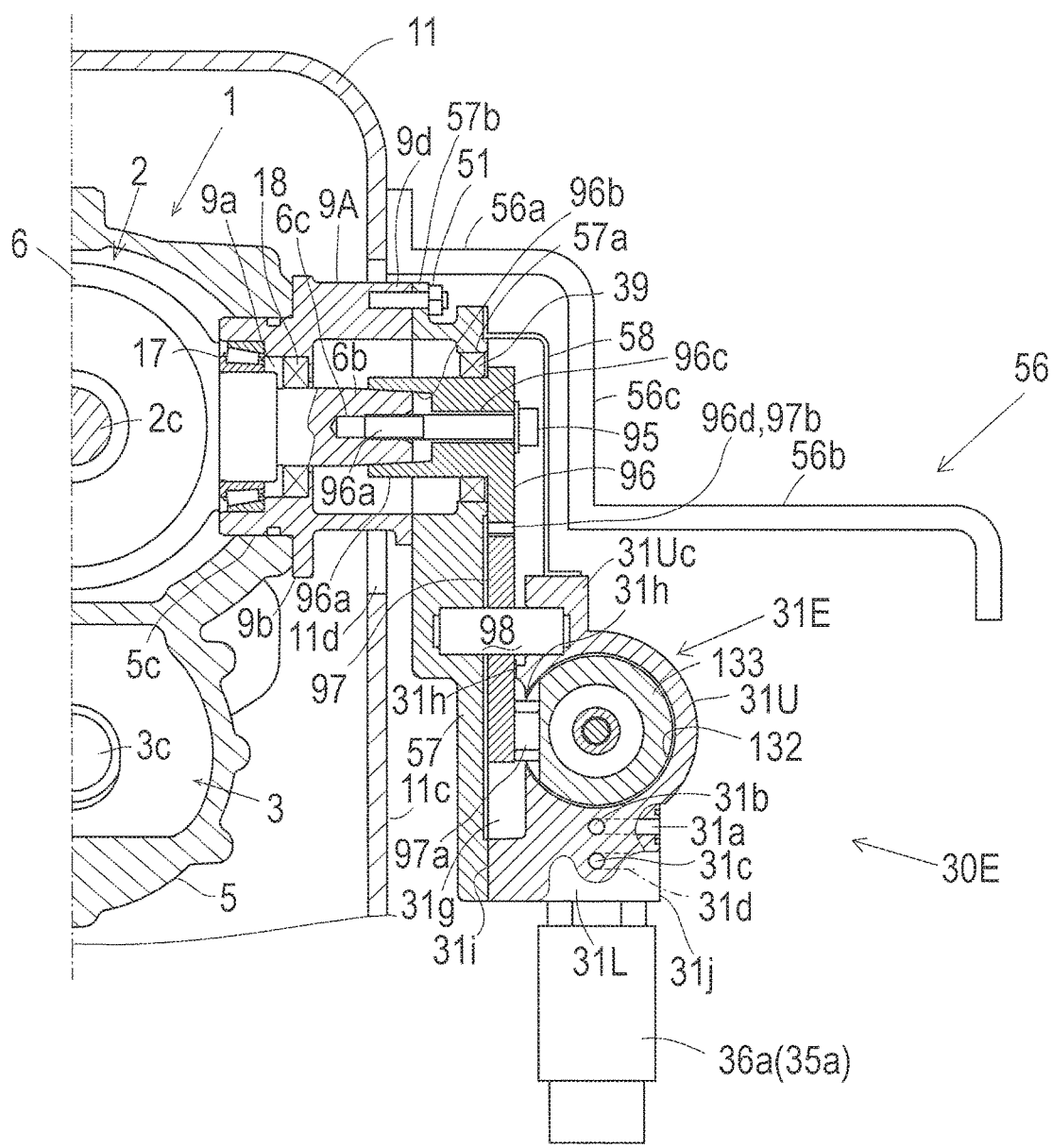
FIG. 22 is a sectional rear view of a servo unit 30E.
Figure 23:
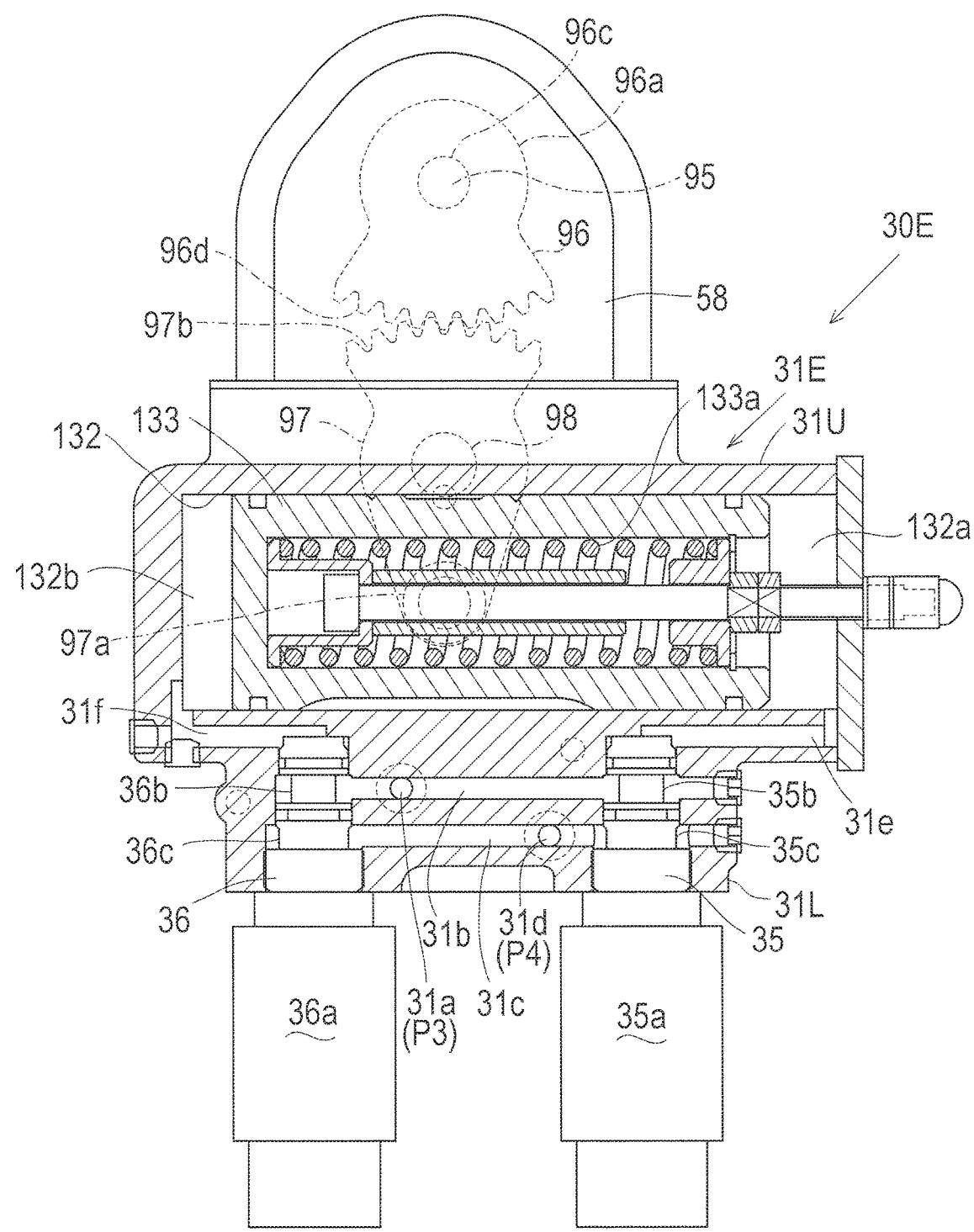
FIG. 23 is a sectional side view of servo unit 30E.

Servo unit 30E will be described with reference to FIGS. 22 and 23. In correspondence to servo unit 30E, a step 56 is fixed to vehicle frame casing 11 at such a low position that is lower than step 55. Step 56 is stepped to have an upper step plate 56$a$, a lower step plate 56$b$ and a vertical plate portion 56$c$ between upper and lower step plates 56$a$ and 56$b$, similar to step 55. In comparison with step 55 having lower step plate 55$b$ that is lower than the upper end of hole 11$d$ and higher than the axis of trunnion shaft 6$b$, step 56 has upper step plate 56$a$ higher than the axis of trunnion shaft 6$b$, and has lower step plate 56$b$ lower than the axis of trunnion shaft 6$b$. If servo unit 30D as shown in FIG. 21 were disposed below step 56, bolt boss 34$d$ of arm 34, upward extended portion 31Ua of servo housing 31D incorporating bolt boss 34$d$, and upper housing portion 31U of servo unit 30D would interfere with lower step plate 56$b$.

In correspondence to the low position of lower step plate 56$b$ of step 56, servo unit 30E includes a servo housing 31E that is entirely lower than the axis of trunnion shaft 6$b$. Therefore, a connection member connecting piston 133 to trunnion shaft 6$b$ does not need to have a laterally long portion, like bolt boss 34$a$, through a servo housing.

On the other hand, since the lowering of servo housing 31E means lowering of hydraulic cylinder 132, the connection member connecting piston 133 to trunnion shaft 6$b$ must be vertically long. If the connection member were an arm, like arm 34, rotatably centered on the axis of trunnion shaft 6*b*, it would be difficult for the connection member to have a portion, like engagement portion 34*a* of arm 34, engaging with piston 133, because such a portion would greatly move vertically and in the fore-and-aft direction during the rotation of the connection member arm centered on the axis of trunnion shaft 6*b*. Further, it might be difficult for piston 133 to ensure the fluidic tightness of fluid chambers 132*a* and 132*b* because hole 31*h* would have to be expanded to allow such a great movement of the portion of the connection member engaging with piston 133.

Therefore, upper and lower sector gears 96 and 97 meshing with each other serve as the connection member for connecting piston 133 of servo unit 30E to trunnion shaft 6*b*. Upper sector gear 96 is formed with a trunnion boss 96*a* having a tapered recess 96*b*, similar to trunnion boss 34*b* of arm 34. Upper sector gear 96 is bored through between a distal side surface thereof and recess 96*b* by a bolt hole 96*c*. A bolt 95 formed with a threaded shaft portion 96*a* is inserted into bolt hole 96*c* from the distal side surface of sector gear 96, so that threaded shaft portion 96*a* is screwed into tapped hole 6*c* in trunnion shaft 6*b* fitted in recess 96*b*, thereby fixing sector gear 96 to trunnion shaft 6*b*. In this way, sector gear 96 and trunnion shaft 6*b* are rotatably integral with each other and centered on the axis of trunnion shaft 6*b* and the axis of bolt 95 coaxial to trunnion shaft 6*b*.

Gear teeth 96*d* formed on a lower edge of upper sector gear 96 mesh with gear teeth 97*b* formed on an upper edge of lower sector gear 97 disposed below upper sector gear 96. Lower sector gear 97 is formed at a bottom end thereof with an engagement portion 97*a* similar to engagement portion 34*a* of arm 34. Engagement portion 97*a* engages with piston 133 in hydraulic cylinder 132. Lower sector gear 97 is provided with a pivot shaft 98 at a vertical middle portion thereof between engagement portion 97*a* and gear teeth 97*b*. When piston 133 engaging with engagement portion 97*a* slides in the fore-and-aft direction, sector gear 97 rotates centered on pivot shaft 98 so as to follow piston 133, thereby rotating sector gear 96 and movable swash plate 6 having trunnion shaft 6*b*.

Servo housing 31E is configured so as to support lower sector gear 97. In this regard, notch 31*g* of servo housing 31E formed along proximal housing side surface 31*i* accommodates a lower portion of sector gear 97. Servo housing 31 has an opening at an upper end of notch 31*g* so that an upper portion of sector gear 97 projects upward from servo housing 31E via the opening at the upper end of notch 31*g*. Pivot shaft 98 is disposed on the upper portion of sector gear 97 projecting upward from servo housing 31E, and is disposed immediately above the opening at the upper end of notch 31*g*. Servo housing 31E is formed with an upward extended portion 31Uc that is extended upward from upper housing portion 31U formed therein with hydraulic cylinder 32 so as to support a distal end portion of pivot shaft 98. Therefore, servo housing 31E does not have a hole like through hole 31*r*, thereby reducing a gap between hydraulic cylinder 132 and proportional pressure control valves 35 and 36, and thereby being minimized vertically.

To attach servo unit 30E, servo housing 31E is fixed to a bearing bracket 9A of HST 1. Incidentally, bearing bracket 9A includes a circularly cylindrical mount boss 9*d* that has a sufficient strength for supporting sector gears 96 and 97. Alternatively, bearing bracket 9 including foot portion 9*c* may be used if there is no problem in the strength.

Servo unit 30E includes a bearing member 57 to be attached to bearing bracket 9A. A lower portion of bearing member 57 is joined to proximal housing side surface 31*i* of servo housing 31E so as to cover notch 31*g*. Bolt 38 (not shown) may be used to fasten bearing member 57 to servo housing 31*i*. Bearing member 57 is vertically extended along proximal side surfaces of sector gears 96 and 97 so as to have the proximal end portion of pivot shaft 98 of sector gear 97 supported by the vertically middle portion of bearing member 57. Bearing member 57 is formed in an upper portion thereof with a bearing hole 57*a* having fluid seal 39 therein, similar to bearing hole 37*a* of cover member 37. Trunnion boss 96*a* of sector gear 96 is passed through bearing hole 57*a* and is journalled by bearing member 57 via fluid seal 39.

Further, in correspondence to mount boss 9*d* of bearing bracket 9A, the upper portion of bearing member 57 is formed with a circularly cylindrical mount boss 57*b*, similar to mount boss 37*c* of cover member 37A. To attach servo unit 30E, mount boss 57*b* contacts mount boss 9*b* of bearing bracket 9A, and bolt 51 fastens mount boss 57*b* to mount boss 9*d* of bearing bracket 9A so as to fix servo housing 31E to bearing bracket 9A.

Incidentally, in servo unit 30 or so on, arm 34 is entirely covered with servo housing 31 and/or cover member 37 except that only the outer end portion of bolt boss 34*d* projects outward from servo housing 31. On the other hand, in servo unit 30E, bearing member 57 is disposed at the proximal side of sector gears 96 and 97, however, entire sector gear 96 and the upper portion of sector gear 97 are extended upward from servo housing 31E so that their distal side surfaces may be exposed. Therefore, a cover 58 is extended from an upper portion of bearing member 57 to a top of upward extended portion 31Uc of servo housing 31E so as to cover the distal side surface of entire sector gear 96 and the distal side surface of the upper portion of sector gear 97.

Incidentally, the head of bolt 95 at the distal side surface of sector gear 96 is also covered with cover 58. Therefore, to enable an operator to access the head of bolt 95, cover 58 may be detachable, or a wrench hole may be provided in cover 58 at a position corresponding to the head of bolt 95 so that an adjustable wrench can be inserted from the outside of cover 58 into the wrench hole so as to engage to the head of bolt 95. Further, cover 58 should be disposed along vertical plate portion 56*b* of step 56. Therefore, another wrench hole may be provided in vertical plate portion 56*b* of step 56 so that the adjustable wrench can be engages to the head of bolt 95 via the wrench holes in vertical plate portion 56*c* of step 56 and cover 58.

All servo units 30, 30A, 30B, 30C, 30D and 30E employ the hydraulic circuit structure shown in FIG. 17, i.e., rely on the assumption that each of them is an assembly as combination of hydraulic cylinder 132 incorporating piston 133 and proportional pressure control valves 35 and 36 for controlling the hydraulic pressures in fluid chambers 132*a* and 132*b* of hydraulic cylinder 132. In this regard, in FIG. 17, the reference numeral "30" is used to designate a representative servo unit for all servo units 30, 30A, 30B, 30C, 30D and 30E. Hereinafter, this representative servo unit is referred to as "servo unit 30".

Figure 24:
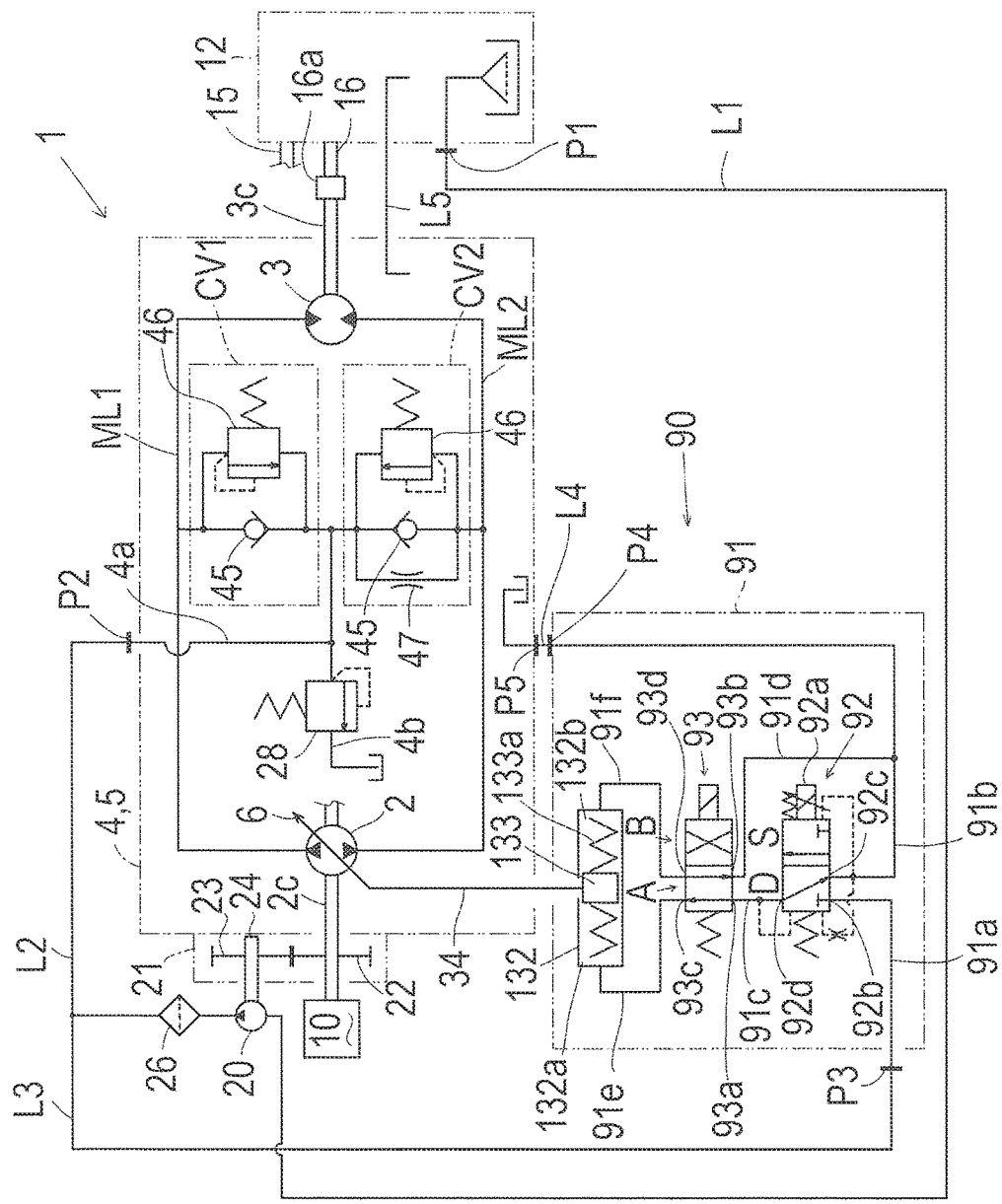
FIG. 24 is a hydraulic circuit diagram for supplying fluid to HST 1 and a servo unit 90.

An alternative servo unit 90 having a hydraulic circuit structure as shown in FIG. 24 will be described. Servo unit 90 includes a servo housing 91 formed therein with hydraulic cylinder 132, similar to servo housing 31. Servo housing 91 is provided with inlet port P3 for receiving fluid from charge pump 20, and with outlet port P4 for discharging fluid therefrom. Solenoid valves 92 and 93 are assembled in servo housing 91. Solenoid valve 92 is a proportional pressure control valve 92 that is expensive, while solenoid valve 93 is a simple directional control valve 93 that is economic.

In this regard, servo unit 30 includes two proportional solenoid valves serving as proportional pressure control valves 35 and 36, so that one is provided for forward traveling of the vehicle, and the other for backward traveling of the vehicle. In other words, one is provided for proportionally controlling the hydraulic pressure of fluid in fluid chamber 132a, and the other for proportionally controlling the hydraulic pressure of fluid in fluid chamber 132b. Therefore, servo unit 30 is expensive due to the two proportional solenoid valves. On the contrary, servo unit 90 includes only one proportional solenoid valve that is proportional pressure control valve 92 provided with a proportional solenoid 92a. Directional control valve 93 is economic because whether its solenoid is excited or not simply depends on whether a reversing (i.e., selecting either the forward or backward traveling direction) manipulator, such as a pedal or a lever, is set at a forward traveling position or a backward traveling position.

Proportional pressure control valve 92 includes three ports, i.e., a suction port 92b, a drain port 92c, a valve port 92d. Directional control valve 93 includes four ports, i.e., a valve port 93a, a drain port 93b, a first fluid chamber connection port 93c, and a second fluid chamber connection port 93d. Suction port 92b of proportional pressure control valve 92 is fluidly connected to inlet port P3 via a fluid passage 91a. Drain port 92b of proportional pressure control valve 92 is fluidly connected to outlet port P4 via a fluid passage 91b. Valve port 92d of proportional pressure control valve 92 is fluidly connected to valve port 93a of directional control valve 93 via a fluid passage 91c. Drain port 93b of directional control valve 93 is fluidly connected via a fluid passage 91d to fluid passage 91b extended from drain port 92c of proportional pressure control valve 92 to outlet port P4. Fluid drained from proportional pressure control valve 92 and fluid from directional control valve 93 are joined to each other via fluid passages 91b and 91d so as to be drained outward from servo housing 91 via outlet port P4. First fluid connection port 93c of directional control valve 93 is fluidly connected to fluid chamber 132a via a fluid passage 91e. Second fluid connection port 93d of directional control valve 93 is fluidly connected to fluid chamber 132b via a fluid passage 91f.

Proportional pressure control valve 92 is vibratorily shifted between supply position S and drain position D due to the control of current applied to proportional solenoid 92a. Proportional pressure control valve 92 set at supply position S fluidly connects valve port 92d to suction port 92b so as to supply fluid from valve port 92d to valve port 93a of directional control valve 93 via fluid passage 91c. Proportional pressure control valve 92 set at drain position D fluidly connects valve port 92d to drain port 92c so as to drain fluid from valve port 93a of directional control valve 93 to fluid passage 91b connected to outlet port P4 via fluid passage 91c. Due to the repeat of vibratory shift of proportional pressure control valve 92 between supply position S and drain position D, a certain hydraulic pressure is given to valve port 93a.

Directional control valve 93 is shifted between a first position A and a second position B by on-off switching of its solenoid depending on the shift of the reversing manipulator between the forward traveling position and the backward traveling position. One of first and second positions A and B corresponds to the forward traveling position, and the other corresponds to the backward traveling position. Hereinafter, description will be based on an assumption that first position A corresponds to the forward traveling position, and second position B corresponds to the backward traveling position.

Directional control valve 93 set at first position A fluidly connects valve port 93a to first fluid chamber connection port 93c, and drain port 93b to second fluid chamber connection port 93d. Therefore, when directional control valve 93 is set at first position A, fluid chamber 132b is fluidly connected via directional control valve 93 to fluid passage 91d connected to drain port P4) bypassing proportional pressure control valve 92, regardless of the set position of proportional pressure control valve 92, and fluid chamber 132a is fluidly connected to valve port 92b of proportional pressure control valve 92 via directional control valve 93.

During the setting of directional control valve 93 at first position A, when proportional pressure control valve 92 is set at supply position S, fluid chamber 132a is fluidly connected to suction port 92b of proportional pressure control valve 92 constantly connected to inlet port P3, so that fluid chamber 132a is supplied with hydraulic fluid from inlet port P3 via proportional pressure control valve 92 so as to be expanded to press piston 133 in the direction to fluid chamber 132b. Due to the pressure of piston 133 by the hydraulic expansion of fluid chamber 132a, fluid is naturally discharged from fluid chamber 132b to outlet port P4 via directional control valve 93 and fluid passage 91d. On the contrary, during the setting of directional control valve 93 at first position A, when proportional pressure control valve 92 is set at drain position D, fluid chamber 132a is fluidly connected to drain port 92c of proportional pressure control valve 92 constantly connected to fluid passage 91b, which is joined to fluid passage 91d and is extended to outlet portion P4. Therefore, both fluid chambers 132a and 132b are fluidly connected not to inlet port P3 but to each other and to outlet port P4, so that the fluid flow between fluid chambers 132a and 132b through valves 92 and 93 and fluid passages 91b and 91d is naturally adjusted freely from the hydraulic pressure of fluid supplied from inlet port P3 so as to locate piston 133 at a position where fluid chambers 132a and 132b are balanced in hydraulic pressure. While directional control valve 93 is set at first position A for forward traveling, finally, piston 133 reaches a target position closer to one end of hydraulic cylinder 132 at fluid chamber 132b side than the other end of hydraulic cylinder 132 at fluid chamber 132a side, so that movable swash plate 6 is located at a corresponding target tilt angle in the tilt direction for forward traveling.

Directional control valve 93 set at first position B fluidly connects valve port 93a to second fluid chamber connection port 93d, and drain port 93b to first fluid chamber connection port 93c. Therefore, when directional control valve 93 is set at second position B, fluid chamber 132a is fluidly connected via directional control valve 93 to fluid passage 91d (connected to outlet port P4) bypassing proportional pressure control valve 92, regardless of the set position of proportional pressure control valve 92, and fluid chamber 132b is fluidly connected to valve port 92b of proportional pressure control valve 92 via directional control valve 93.

During the setting of directional control valve 93 at first position B, when proportional pressure control valve 92 is set at supply position S, fluid chamber 132b is fluidly connected to suction port 92b of proportional pressure control valve 92 constantly connected to inlet port P3, so that fluid chamber 132b is supplied with hydraulic fluid from inlet port P3 via proportional pressure control valve 92 so as to be expanded to press piston 133 in the direction to fluid chamber 132a. Due to the pressure of piston 133 by the hydraulic expansion of fluid chamber 132b, fluid is naturally discharged from fluid chamber 132a to outlet port P4 via directional control valve 93 and fluid passage 91*d*. On the contrary, during the setting of directional control valve 93 at first position B, when proportional pressure control valve 92 is set at drain position D, fluid chamber 132*b* is fluidly connected to drain port 92*c* of proportional pressure control valve 92 constantly connected to fluid passage 91*b*, which is joined to fluid passage 91*d* and is extended to outlet portion P4. Therefore, both fluid chambers 132*a* and 132*b* are fluidly connected not to inlet port P3 but to each other and to outlet port P4, so that the fluid flow between fluid chambers 132*a* and 132*b* through proportional pressure control valves 92 and 93 and fluid passages 91*b* and 91*d* is naturally adjusted so as to locate piston 133 at a position where fluid chambers 132*a* and 132*b* are balanced in hydraulic pressure. While directional control valve 93 is set at first position B for backward traveling, finally, piston 133 reaches a target position closer to one end of hydraulic cylinder 132 at fluid chamber 132*a* side than the other end of hydraulic cylinder 132 at fluid chamber 132*b* side, so that movable swash plate 6 is located at a corresponding target tilt angle in the tilt direction for backward traveling.

The above-mentioned configuration of servo unit 90 shown in FIG. 24 may adapted to any of servo unit 30 to 30E shown in FIGS. 15, 16, and 18 to 23. In other words, servo unit 90 is provided with a connection means for connecting piston 133 to trunnion shaft 6*b*. This connection means may be either an arm like arm 34 employed by each of servo units 30, 30A, 30B, 30C and 30D or sector gears like sector gears 96 and 97 employed by servo unit 30E.

If servo housing 91 is configured so as to be fixed to bearing bracket 9 or 9A of HST 1, servo unit 90 may be provided with any one of cover members 37, 37A and 37D and bearing member 57. If servo housing 91 is configured so as to be fixed to vehicle frame casing 11, servo unit 90 may have the structure as shown in FIG. 19. If servo housing 91 is configured so as to be fixed to step 14, servo unit 90 may have the structure as shown in FIG. 20. Servo housing 91 may have the structure of any one of servo housings 31, 31A, 31C, 31D and 31E depending on which portion of servo housing 91 should have outlet port P4, which member or portion should have servo housing 91 fixed thereto, or so on.

It is further understood by those skilled in the art that the foregoing description is a preferred embodiment of the disclosed device and that various changes and modifications may be made in the invention without departing from the scope thereof defined by the following claims.

What is claimed is:

1. An actuator unit for controlling a hydraulic pump, the actuator unit comprising:
   an actuator for controlling a rotational position of a displacement control member of the hydraulic pump, wherein the actuator is a piston in a hydraulic cylinder;
   a connection member connected to the actuator, the connection member being formed with a boss extended from the connection member and a recess disposed coaxially in the boss,
   wherein a tip portion of a trunnion shaft serving as a pivotal shaft of the displacement control member is fitted into the recess; and
   a fastener passed through the boss to engage with the tip portion of the trunnion shaft in the recess so as to fasten the trunnion shaft to the connection member, wherein the fastener is oriented axially with the boss,
   wherein the actuator and connection member are configured to be removed from the trunnion shaft after removal of the fastener without any disassembly of the actuator or connection member.

2. The actuator unit according to claim 1, wherein the recess and the tip portion of the trunnion shaft are tapered.

3. The actuator unit according to claim 1, wherein the hydraulic pump controlling actuator unit is a servo unit including the hydraulic cylinder incorporating the piston serving as the actuator.

4. An actuator unit for controlling a hydraulic pump, the actuator unit comprising:
   an actuator for controlling a rotational position of a displacement control member of the hydraulic pump, wherein the actuator is a piston in a hydraulic cylinder;
   a connection member connected to the actuator, the connection member being formed with a boss extended from the connection member and a recess disposed coaxially in the boss,
   wherein a tip portion of a trunnion shaft serving as a pivotal shaft of the displacement control member is fitted into the recess;
   a fluid passage in communication with the trunnion shaft, wherein a part of fluid supplied to the hydraulic cylinder is supplied through the fluid passage as lubricating fluid to the trunnion shaft fastened to the connection member; and
   a fastener passed through the boss to engage with the tip portion of the trunnion shaft in the recess so as to fasten the trunnion shaft to the connection member,
   wherein the hydraulic pump controlling actuator unit is a servo unit including the hydraulic cylinder incorporating the piston serving as the actuator.

5. The actuator unit according to claim 1, wherein the fastener is oriented coaxially with the boss.

* * * * *